US012280598B2

(12) United States Patent
Schodin et al.

(10) Patent No.: US 12,280,598 B2
(45) Date of Patent: Apr. 22, 2025

(54) PRINTHEAD CLEANING DEVICES WITH CLEANING AGENT FOUNTAINS

(71) Applicant: Hewlett-Packard Development Company, L.P., Spring, TX (US)

(72) Inventors: Chris Paul Schodin, San Diego, CA (US); Krzysztof Nauka, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 85 days.

(21) Appl. No.: 18/015,248

(22) PCT Filed: Jul. 7, 2020

(86) PCT No.: PCT/US2020/040967

§ 371 (c)(1),
(2) Date: Jan. 9, 2023

(87) PCT Pub. No.: WO2022/010457

PCT Pub. Date: Jan. 13, 2022

(65) Prior Publication Data

US 2023/0264477 A1 Aug. 24, 2023

(51) Int. Cl.
*B41J 2/165* (2006.01)

(52) U.S. Cl.
CPC ....... *B41J 2/16552* (2013.01); *B41J 2/16538* (2013.01); *B41J 2002/16555* (2013.01)

(58) Field of Classification Search
CPC ................ B41J 2/16552; B41J 2/16538; B41J 2002/16555
See application file for complete search history.

(56) References Cited

U.S. PATENT DOCUMENTS

| | | | | |
|---|---|---|---|---|
| 4,340,897 | A | 7/1982 | Miller | |
| 5,432,539 | A * | 7/1995 | Anderson | B41J 2/16552 346/139 D |
| 5,793,390 | A | 8/1998 | Claflin et al. | |
| 6,189,999 | B1 * | 2/2001 | Pham | B41J 2/16544 347/33 |
| 6,382,767 | B1 | 5/2002 | Greive | |
| 8,167,395 | B2 | 5/2012 | Fienup et al. | |
| 9,162,463 | B2 | 10/2015 | Ito | |
| 2013/0293632 | A1 | 11/2013 | Menzel et al. | |
| 2020/0055246 | A1 | 2/2020 | Wehrmann et al. | |

FOREIGN PATENT DOCUMENTS

| | | | |
|---|---|---|---|
| EP | 0562118 | B1 | 3/1998 |
| JP | 2000-203040 | A | 7/2000 |

* cited by examiner

*Primary Examiner* — Sharon Polk
(74) *Attorney, Agent, or Firm* — Shook, Hardy & Bacon L.L.P.

(57) ABSTRACT

In one example in accordance with the present disclosure, a printhead cleaning device is described. The printhead cleaning device includes a first spout to generate a first cleaning agent fountain to bathe a printhead die as it traverses over the printhead cleaning device. A pump passes the cleaning agent through the first spout to generate the first cleaning agent fountain. The printhead cleaning device also includes a structure to support the first spout.

14 Claims, 19 Drawing Sheets

PRINTHEAD CLEANING DEVICES WITH CLEANING AGENT FOUNTAINS

BACKGROUND

A printhead die is a component of a printing device. The printhead die includes components that manipulate fluid flowing through the printing device. For example, a printhead die includes a number of fluid ejectors that eject fluid onto a surface. Through these fluid ejectors, fluid, such as ink and fusing agent among others, is ejected.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
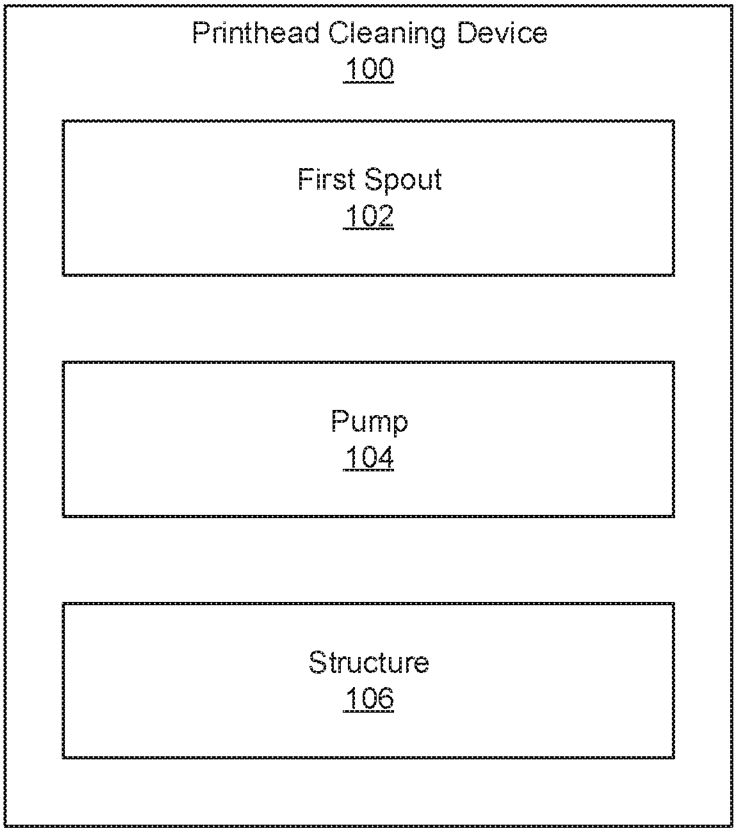
FIG. 1 is a block diagram of a printhead cleaning device with a cleaning agent fountain, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

As described above, printing devices in general dispense print fluid such as ink onto a surface in the form of images, text, or other patterns. The ink may be held in a reservoir, such as a replaceable cartridge. The fluid in the reservoir is passed to a printhead die that contains fluid ejectors. Each fluid ejector includes components that manipulate fluid to be ejected. Through these fluid ejectors, fluid, such as ink and fusing agent among others, is ejected or moved.

These printing devices may be of a variety of types including inkjet printers, multi-function printers (MFPs), and additive manufacturing apparatuses. The printhead die in these printing devices are used for precisely, and rapidly, dispensing small quantities of fluid. For example, in an additive manufacturing apparatus, the printhead die dispenses fusing agent. The fusing agent is deposited on a build material, which fusing agent facilitates the hardening of build material to form a three-dimensional product.

Other printing devices dispense ink on a two-dimensional print medium such as paper. For example, during inkjet printing, fluid is directed to a printhead die. Depending on the content to be printed, the printing device in which the printhead die is disposed determines the time and position at which the fluid drops are to be released/ejected. In this way, the printhead die releases multiple fluid drops over a predefined area to produce a representation of the content to be printed. Besides paper, other forms of print media may also be used.

Accordingly, as has been described, the devices and methods described herein may be implemented in a two-dimensional printing, i.e., depositing fluid on a substrate, and in three-dimensional printing, i.e., depositing a fusing agent or other functional agent on a material base to form a three-dimensional printed product. Such printhead dies may be found in other devices such as digital titration devices and/or other such devices with which volumes of fluid may be selectively and controllably ejected.

Each printhead die includes a fluid ejector to move fluid. The fluid ejector may be disposed in an ejection chamber, which chamber has an opening. The fluid ejector, upon actuation, causes ejection of a fluid drop via the opening.

Examples of fluid ejectors include a piezoelectric membrane-based actuator, a thermal resistor-based actuator, an electrostatic membrane actuator, a mechanical/impact driven membrane actuator, a magneto-strictive drive actuator, or other such elements that may cause displacement of fluid responsive to electrical actuation. A printhead die may include a plurality of fluid ejectors, which may be referred to as an array of fluid ejectors.

While such printhead die have undoubtedly advanced the field of precise fluid delivery, some conditions impact their effectiveness. For example, the fluid that is ejected through the printhead die may, over time, be harmful to the printhead die and may impact ejection characteristics. For example, residual fluid on a printhead die may harden, and in some cases may crust over the openings of the printhead die. Such crusting may block the opening altogether. A partial blocking of the opening may also impact printing as it may alter fluid trajectory from the opening.

Other factors may impede the flow of fluid through the openings. For example, in the case of additive manufacturing apparatuses where a fusing, or other agent, is deposited on a bed of powder build material, the impact of the agent on the powder build material may cause powder particles to rise and adhere to the surface of the printhead die. As with the fluid, these fine particle powders may clog or otherwise negatively impact the operation of the printhead die.

Accordingly, for these reasons or any number of other reasons, the present specification provides a cleaning device that cleans any residual fluid or debris off of the printhead die and does so in a gentle fashion so as to not damage the printhead die.

Specifically, the present specification describes an in-line printhead die cleaning device that uses a cleaning agent fountain, and in some examples other components such as a wet brush and a wicking brush, to clean the printhead die. The printhead cleaning device may execute multiple cleaning operations such as 1) presoak/fluid jetting, 2) wipe wicking, 3) wet agitation, and 4) wicking to dry. The in-line printhead cleaning device includes a spout that creates a cleaning agent fountain.

As such, the printhead cleaning device removes fluid, such as harsh fluids used in 3D printing, as well as others from the printhead die without degrading the printhead die. In some examples, the fluid ejector is fired when in the cleaning agent fountain to purge the opening of the fluid ejector. As the fluid ejector is fired when in the cleaning agent fountain, the printhead cleaning device reduces printhead die contamination by preventing the formation of aerosols. For example, were the fluid ejectors activated outside the fountain, a fluid aerosol cloud may form, which may lead to re-deposition of the fluid on the printhead die. The present system also reduces cleaning time by cleaning and drying the printhead die in both directions as a print cartridge travels to and from a printing area.

Specifically, the present specification describes a printhead cleaning device. The printhead cleaning device includes a first spout to generate a first cleaning agent fountain to bathe a printhead die as it traverses over the printhead cleaning device. A pump of the printhead cleaning device passes cleaning agent through the first spout to generate the first cleaning agent fountain and a structure supports the first spout.

The present specification also describes a method for cleaning a printhead die with a cleaning agent fountain. The method includes, during a first pass of a printhead die over a printhead cleaning device, which first pass is in a first direction 1) bathing the printhead die in a first cleaning agent meniscus fountain, 2) brushing the printhead die with a wicking brush, and 3) simultaneously bathing the printhead die in a second cleaning agent meniscus fountain and brushing the printhead die with a wet brush. During a second pass of the printhead die over the printhead cleaning device, which second pass is in a second direction, the printhead die is brushed with 1) a wet brush without the second cleaning agent meniscus fountain and 2) a wicking brush.

The present specification also describes a non-transitory machine-readable storage medium. The non-transitory machine-readable storage medium includes instructions executable by a processor. The instructions are executable by a processor to, during a first pass of a printhead die over a printhead cleaning device, which first pass is in a first direction, 1) activate a pump to generate a first cleaning agent meniscus fountain and a second cleaning agent meniscus fountain as the printhead die traverses over the printhead cleaning device and 2) activate fluid ejectors of the printhead die when the printhead die is bathed in the first cleaning agent meniscus fountain. The instructions are also executable by the processor to, during a second pass of the printhead die over the printhead cleaning device, which second pass is in a second direction, de-activate the pump to facilitate dry agitation of the printhead die by brushes of the printhead cleaning device.

As described above, the above printhead cleaning devices remove many types of stubborn, harsh ink-jetted fluids from the printhead die without degrading the printhead die. Moreover, such a printhead cleaning device 1) reduces cycle time by cleaning and drying the printhead die in both directions in a printing cycle; 2) is in-line with the print cartridge travel path; 3) is low maintenance with a single moving part, i.e., a pump; 4) avoids use of paper medium for fluid capture or drying; 5) cools the printhead die; 6) provides local or remote cleaning agent collection; and 7) prevents contact between a cleaning agent and other portions of the print cartridge.

As used in the present specification and in the appended claims, the term "print cartridge" may refer to a device used in the ejection of ink, or other fluid, onto a medium such as a print medium, a well plate, a membrane used for an assay, or a sensor substrate.

Accordingly, as used in the present specification and in the appended claims, the term "printing device" is meant to be understood broadly as any device capable of selectively placing a fluid, such as ink, fusing agent, and/or a biological fluid onto a medium. In one example the printing device is an inkjet printer. In another example, the printing device is a three-dimensional printer. In yet another example, the printing device is a digital titration device.

Further, as used in the present specification and in the appended claims, the term "printhead die" refers to a component that includes fluid ejectors to eject fluid such as ink and fusing agent. The term "printhead" also refers to any device that uses piezo or thermal actuators to eject fluid, regardless of the substance being ejected. For example, as described above a printhead die may be used in a digital titration device to eject a biological sample.

Turning now to the figures, FIG. 1 is a block diagram of a printhead cleaning device (100) with a cleaning agent fountain, according to an example of the principles described herein. As described above, a printhead die refers to a component of a printing device that ejects small droplets of fluid in particular patterns onto a medium, the ejection being controlled by a controller. The printhead die includes fluid ejectors that include components that effectuate the ejection of such fluid. In one particular example, a fluid ejector resides in an ejection chamber and expels fluid through an opening. The controller sends signals to the printhead die to trigger sequential ejections by different of the fluid ejectors such that fluid, such as ink, is deposited on the medium in a particular pattern.

As described above, residual fluid and/or other debris may partially or completely block the openings such that fluid ejection is impacted. Accordingly, the printhead cleaning device (100) of the present specification cleans residual fluid and/or debris from the surface of the printhead die to ensure accurate fluid deposition and to prolong the life of the printhead die.

The printhead cleaning device (100) includes a first spout (102) to generate a first cleaning agent fountain. Specifically, the printhead cleaning device (100) may be positioned such that a print cartridge passes over the printhead cleaning device (100). The pump (104) may push fluid vertically through the first spout (102) such that cleaning agent flows out as a fountain.

In one example, the fountain refers to a volume of fluid such as water, that is pushed upwards. As the fluid travels upward, it loses cohesion and falls downward in the form of droplets. In one particular example, the fountain is a meniscus fountain meaning that the volume of upwardly flowing fluid maintains its cohesion forming a convex-shaped meniscus and does not break into individual droplets. In this example, the fluid falls as a continuous volume rather than as discrete droplets. Implementing a meniscus fountain provides that the ejected fluid forms a continuous meniscus and the print cartridge entering the meniscus fountain does not disturb the flowing liquid.

That is, with a non-meniscus fountain, the fluid that is transported vertically reaches an apex and then flows down the spout (102) without aerating. By comparison, using a meniscus fountain, the fluid's surface tension remains constant such that a seal may be formed around the printhead die.

Forming a meniscus fountain may lead to increased debris removal. That is, when continuous water volume breaks into discrete droplets, the total energy of the system increases due to increase of the surface energy (sum of surface energies of individual droplets). Water molecules residing inside the volume balance each other (pull each other uniformly in every direction via hydrogen-hydrogen integrations) and the net interaction energy per molecule is not high. Water molecules that are near or at the surface are not balanced (they are pulled more in one direction than the other). When debris is removed, it is because the attractive interactions (usually in form of H—H attractive interactions) between the debris molecules and water molecules is stronger than water molecule-water molecule interactions. In case of "cohesive" water flow (large volume, not broken into droplets) that results from a meniscus fountain this is easier to achieve because the surface energy is small. By comparison, in the case of water flowing in form of droplets, the removal of dirt occurs when the debris-water interactions overcome additional component of the surface energy holding water molecules together.

During use, the cleaning agent in the meniscus fountain engages with the printhead die and forms a surface tension seal on the protruding printhead die(s). When the meniscus fountain is not engaged with the printhead die, there is a 90-degree meniscus over the lip of spout (102) edge and the cleaning agent remains in contact with the spout, again relying on surface tension. A number of characteristics of the spout (102) and/or cleaning agent may be selected to provide the meniscus fountain. Examples include a fluid viscosity, a surface area of the spout (102) opening, geometry of the spout (102), perimeter of the spout (102), a spout edge lip profile, a depth of the spout (102), and a distance to the target overhead surface to be bathed in the fluid, i.e., the printhead die. In one particular example, the pump (104) may generate 2-3 millimeters per second flow rate.

As the printhead die traverses over the printhead cleaning device (100), the printhead die is bathed in the cleaning agent fountain, which may be a meniscus fountain. In some examples, the cleaning agent may be water or another fluid such as a solvent to dissolve, break down, or otherwise remove the residual ejected fluid and debris that may be left on the printhead die. Using a cleaning agent fountain provides a gentle, medium-free manner to clean off the printhead die. That is, rather than relying on a paper medium to wipe off the residual ejected fluid and debris, which paper medium is a consumable component that is replaced over time, the cleaning agent fountain provides a simple, effective component to gently remove residual ejected fluid and debris.

The printhead cleaning device also includes a pump (104) to pass cleaning agent through the first spout (102) to generate the first cleaning agent fountain. The pump (104) may be operated to generate a fountain height such that the printhead die may be bathed therein, but not so great as to spill out onto other components of the printing device.

The printhead cleaning device (100) also includes a structure to support the first spout (102). In some examples, the structure (106) may be a housing in which the first spout (102) is integrally formed and in which the pump (104) is disposed. This structure (106) may also house other components of the printhead cleaning device (100) such as a reservoir and/or a system for recycling the cleaning agent that passes through the first spout (102). Such a printhead cleaning device (100) may reliably remove chemically harsh, high viscosity fluid residue from a printhead die without degrading the print cartridge. As described above, the present printhead cleaning device (100) may also remove powder residue originating from a metal or plastic powder bed used in 3D printing.

Figure 2:
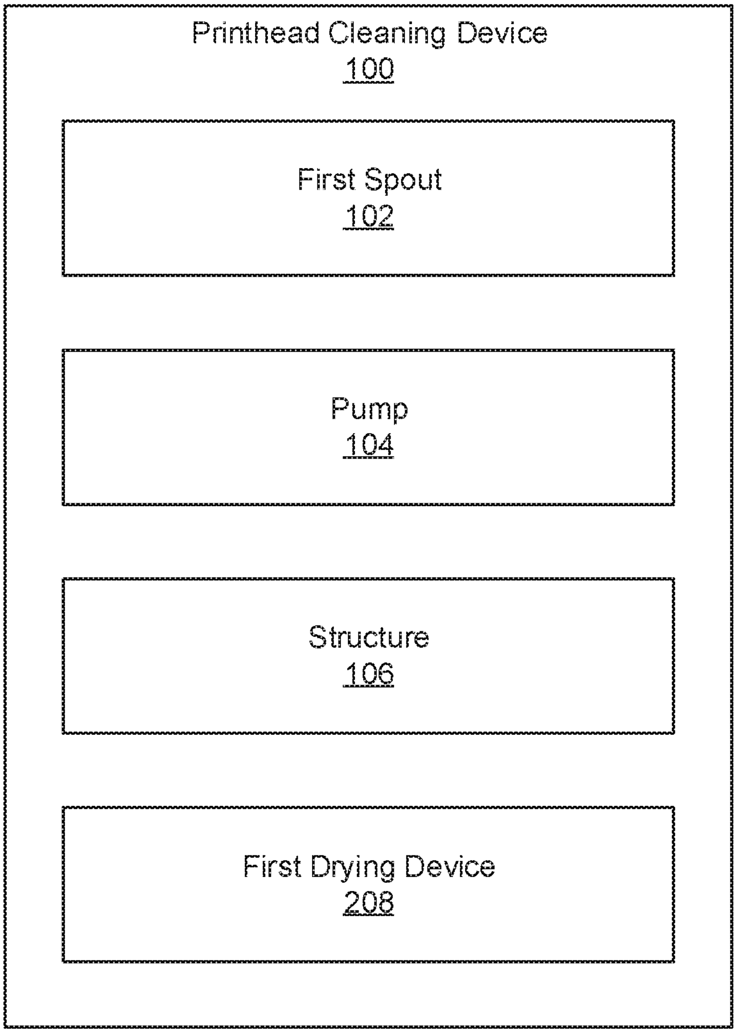
FIG. 2 is a block diagram of a printhead cleaning device with a cleaning agent fountain, according to an example of the principles described herein.

FIG. 2 is a block diagram of a printhead cleaning device (100) with a cleaning agent fountain, according to an example of the principles described herein. In this example, the printhead cleaning device (100) also includes a first drying device (208). That is, the fountain, which may be a meniscus fountain, generated by the first spout (102) may bathe the printhead die in a cleaning agent and the first drying device (208) removes residual cleaning agent and debris from the printhead die. The first drying device (208) therefore removes residual cleaning agent so that the print cartridge is not wet while traveling over the target surface, whether it's paper or a 3D powder build area.

The first drying device (208) may be of a variety of types. For example, the first drying device (208) may be a wicking brush. The bristles of the wicking brush may be flexible such that they deflect when in contact with the printhead die. Such a wicking brush is not intended to scrub the debris and residual cleaning agent, but rather wick the debris and residual cleaning agent away. That is, the bristles of the wicking brush break the surface tension between the cleaning agent and the printhead die such that the cleaning agent falls away from the printhead die surface. Accordingly, such a wicking brush gently removes debris and residual cleaning agent, rather than abrasively removing the debris from the surface.

Such a wicking brush may remain clean and dry enough throughout all the wiping. This is accomplished by the motion of the wicking brush and the breaking of the surface tension on the fluid droplets on the die. In some examples, this action is cyclic and the popping of the fluid droplets at the tip of the bristles creates a flushing action where a fluid drop is directed downward. Further down the wicking brush, the motion of the bristle shafts (due to contact with the printhead die) and gravity causes the fluid droplets to convey down and away from the printhead die thus creating the above described wicking action. This wicking action maintains the wicking brush dry so as to continually remove residual cleaning fluid with trapped debris away from the printhead die.

In another example, the first drying device (208) is a wet brush that includes a second spout to bathe the printhead in a second vertical cleaning agent meniscus and bristles to interface with the surface of the printhead die. In this example, at some stages of the cleaning operation, the second spout may be de-activated such that just the bristles of the wet brush interact with the surface of the printhead die in a similar fashion as described above with regards to the wicking brush. That is, as described above, in this example, the bristles wick away residual cleaning agent and debris by breaking the surface tension of the cleaning agent on the printhead die. In some cases, the second spout may be activated at the same time the bristles interface with the surface such that residual ink is removed and wicked simultaneously.

Other examples of drying devices include a squeegee, for example formed of a rubber material, an air knife, and/or a wiping surface. While specific reference is made to a few example drying devices, other types of drying devices may be implemented in accordance with the principles described herein.

Accordingly, the printhead cleaning device (100) described in FIG. 2 washes away residual fluid and debris and wicks away the cleaning agent and debris as well, leaving a clean and dry printhead die which can then continue to perform printing operations.

Figure 3:
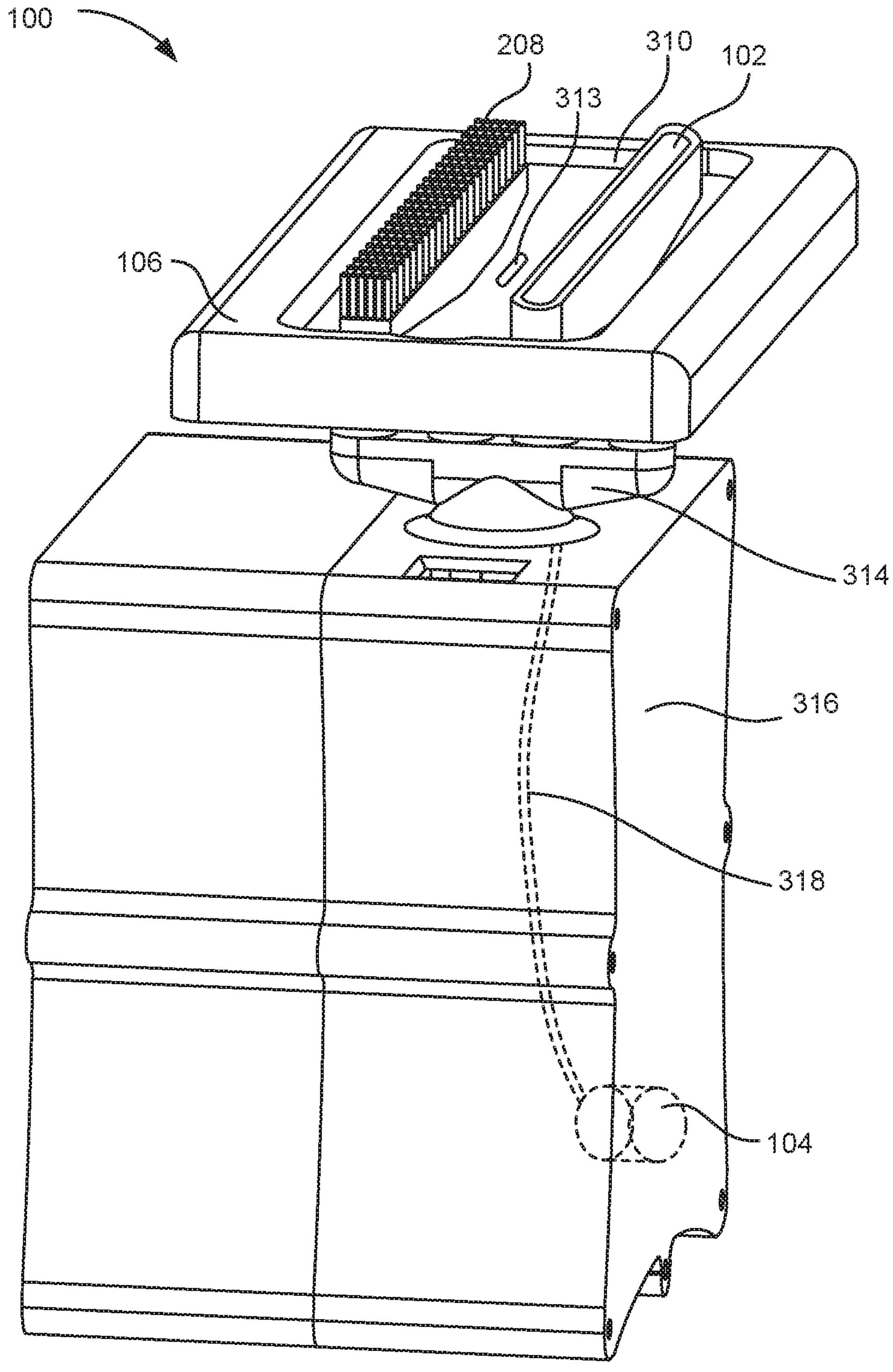
FIG. 3 is an isometric view of a printhead cleaning device with a cleaning agent fountain, according to an example of the principles described herein.

FIG. 3 is an isometric view of a printhead cleaning device (100) with a cleaning agent fountain, according to an example of the principles described herein. FIG. 3 clearly depicts the structure (106) that supports the first spout (102). FIG. 3 also depicts the pump (104) that in the example depicted in FIG. 3 resides in a reservoir (316). The pump (104) passes fluid to the first spout (102) via fluid tubes (318). While FIG. 3 depicts the pump (104) and reservoir (316) as being integral with other components of the printhead cleaning device (100), in other examples, the pump (104) and/or reservoir (316) may be disposed on a separate structure with tubes (318) extending from the pump (104) and reservoir (316) to the first spout (102) which is disposed on the printhead cleaning device (100) itself.

FIG. 3 also clearly depicts the first spout (102) that generates the first cleaning agent fountain in which the printhead die is bathed. As described above, the first cleaning agent fountain may be a meniscus fountain that maintains cohesion as it falls and does not fall as dispersed droplets. A meniscus fountain may promote cleanliness as the dispersed droplets may splash onto other surfaces and may promote distribution of the captured debris on various surfaces where it may not be desired. A meniscus fountain, by maintaining cleaning agent cohesion falls as a cohesive flow and thereby more specifically directs the cleaning agent, along with any captured residual ejected fluid and debris, thus preventing splashing.

FIG. 3 also depicts a first drying device (208), which in the example depicted in FIG. 3 is a wicking brush. In these examples, the first spout (102) and the first drying device (208) may extend a length of the printhead die. That is, all openings of the printhead die pass through the cleaning agent fountain and over the first drying device (208).

Note that the wicking brush and the wet brush may have any number of characteristics that may affect their rigidity and ability to gently wick residual cleaning agent from the printhead die. That is, while FIG. 3 depicts brushes with particular characteristics, any number of characteristics including a width of the brush, a density of the bristles, a material of the bristles, bristle diameter, etc. may be selected such that the bristles have a desired rigidity and cleaning effect.

As described above, both the wicking brush and the wet brush may remain dry due to the wicking action. That is, the popping of the fluid droplets at the tip of the bristles creates a flushing action of fluid away from the bristle tips down through the bristles. Further down the brush, the motion of the bristle shafts and gravity further direct the fluid away from the tips. Thus, the brush bristle tips are dry and may continually wick away additional residual ejected fluid and cleaning agent.

In some examples, the printhead cleaning device (100) includes a collection receptacle (310) to gather excess cleaning agent. In this example, the first spout (102) and the first drying device (208) are disposed in the collection receptacle (310). Accordingly, during operation, cleaning agent rises up from the first spout (102) and collects in the collection receptacle (310). In this example, the printhead cleaning device (100) includes a reservoir. Fluid flows into an opening (313) into the conduit (314) which directs collected fluid from the collection receptacle (310) to the reservoir (316) such that cleaning agent may be recycled and reused. As described above, in some examples, the reservoir (316), fluid conduit (314), first spout (102), and first drying device (208) are integrated into a single housing of the printhead cleaning device (100). However, in other examples the reservoir (316), and in some examples the pump (104), may be on a separate structure from the first spout (102) and first drying device (208).

Figure 4:
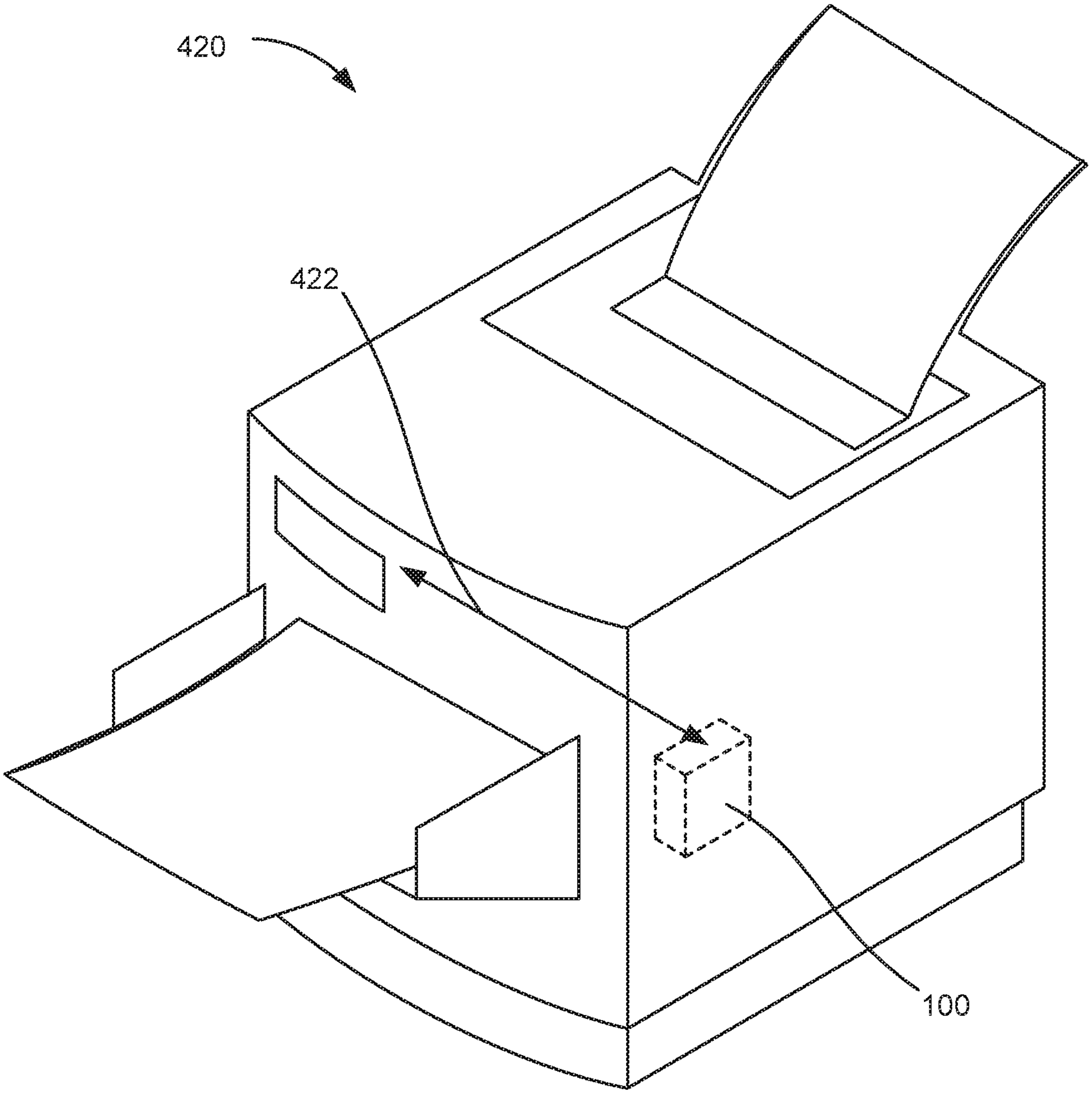
FIG. 4 is an isometric view of a printing device with a printhead cleaning device disposed therein, according to an example of the principles described herein.

FIG. 4 is an isometric view of a printing device (420) with a printhead cleaning device (100) disposed therein, according to an example of the principles described herein. As described above, a printing device (420) refers to any device that operates to deposit fluid onto a surface. One specific example is a two-dimensional printer that deposits a fluid such as ink on a target surface such as paper. In another example, a 3D printer deposits fusing agent onto a surface such as a powder build material bed. In either case, the printhead cleaning device (100) may be disposed in the printing device (420). In FIG. 4, the printhead cleaning device (100) is indicated in dashed lines to indicate its position inside the printing device (420).

While specific reference is made to a few types of printing device (420) and while FIG. 4 depicts a particular printing device (420), the printhead cleaning device (100) may be modular and compact and may be implemented in many types of printing devices (420). Moreover, the printhead cleaning device (100) may be scalable to clean different sizes and shapes of printhead die. For example, a page-wide printer may have larger cartridges as compared to an enterprise desktop printer. Accordingly, the printhead cleaning device (100) and more specifically, the first spout (102) and the first drying device (208) implemented therein, may be sized to match the size of the printhead die of whatever printing device (420) they are implemented in.

The printhead cleaning device (100) may be disposed adjacent a print area of the printing device (420). That is, during printing, the print cartridge may travel along a path (422). In this example, the printhead cleaning device (100) may be disposed at an end of that path (422) such that the print cartridge travels along the same path (422), albeit a further distance, to reach the printhead cleaning device (100).

Figure 5:
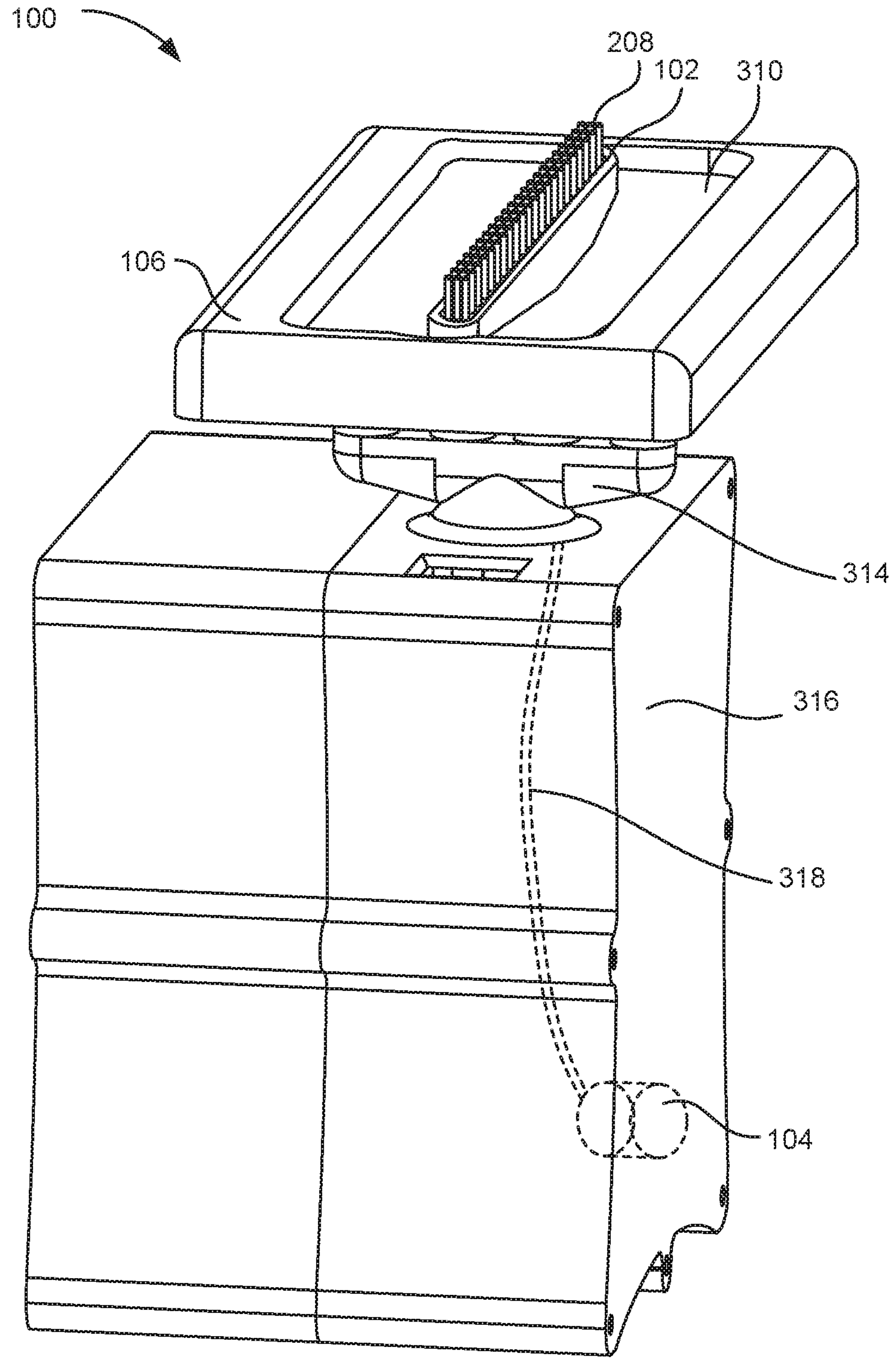
FIG. 5 is an isometric view of a printhead cleaning device with a cleaning agent fountain, according to an example of the principles described herein.

FIG. 5 is an isometric view of a printhead cleaning device (100) with a cleaning agent fountain, according to an example of the principles described herein. In the example depicted in FIG. 5, the first drying device (208), which in this case is a wicking brush, is integrated with the first spout (102) and enveloped by the first cleaning agent fountain. While FIG. 5 depicts a wicking brush, the drying device (208) may be other types as well including a squeegee or an air knife. In this example, during a first pass of the printhead die over the printhead cleaning device (100), such as when the printhead die is returning from depositing fluid, the pump (104) may be activated to generate a fountain such as a meniscus fountain. During this first pass, the fountain bathes the printhead die in cleaning agent thus removing debris. Also during this first pass, the bristles of the wicking brush interface with the surface of the printhead die to remove debris and crusted-on fluid from the printhead die.

By comparison, during a second pass of the printhead die over the printhead cleaning device (100), such as when the printhead die is heading out to deposit fluid, the pump (104)

may be de-activated to prevent generation of a fountain, thus preventing excess cleaning agent from remaining on the printhead die as it deposits fluid on a target surface. During this second pass however, the printhead die still interfaces with the brush which wicks away any residual cleaning agent and to abrade off any solid particles from the printhead die.

Figure 6:
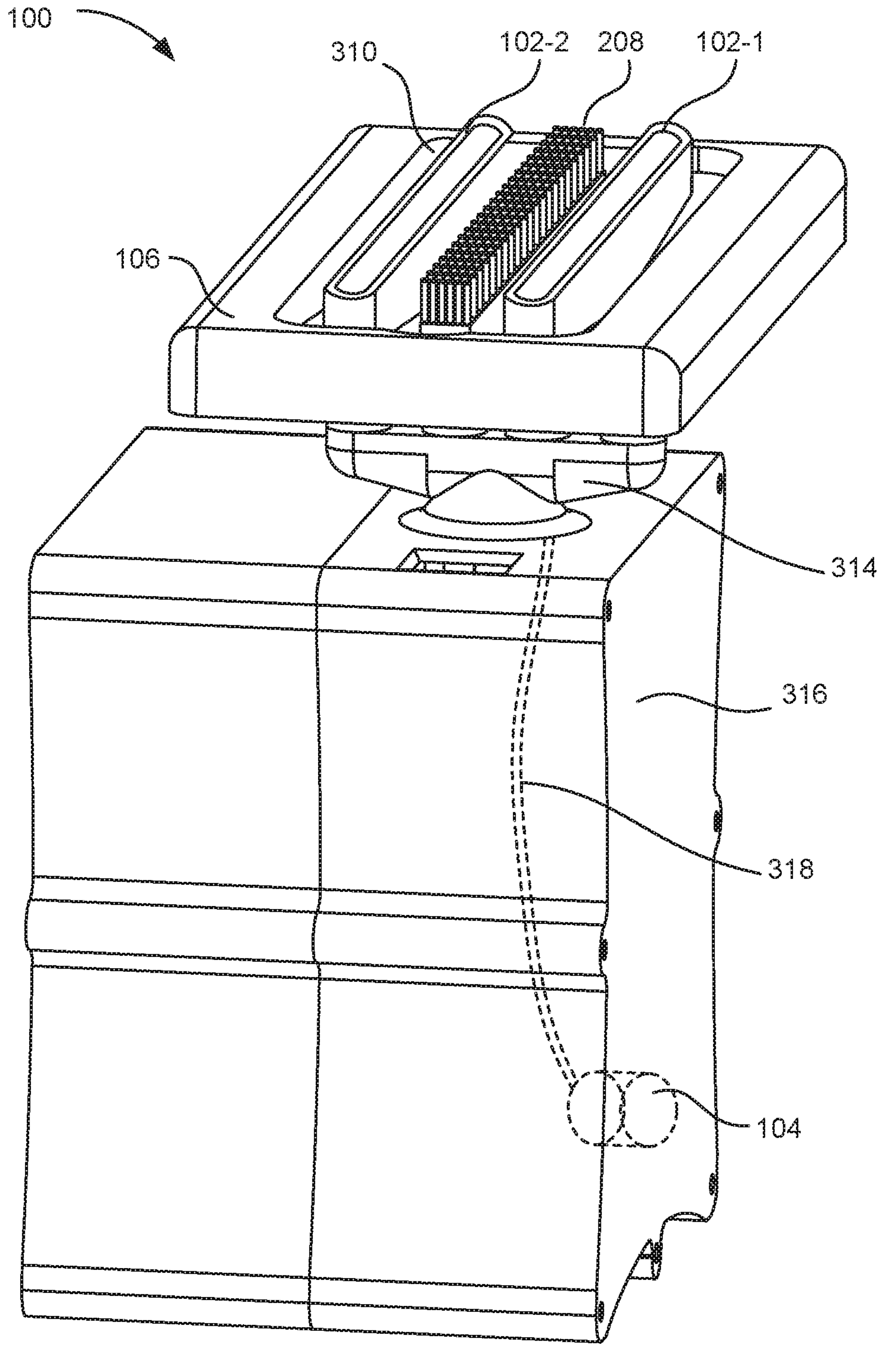
FIG. 6 is an isometric view of a printhead cleaning device with a cleaning agent fountain, according to an example of the principles described herein.

FIG. 6 is an isometric view of a printhead cleaning device (100) with a cleaning agent fountain, according to an example of the principles described herein. In the example depicted in FIG. 6, the printhead cleaning device (100) includes a second spout (102-2) to generate a second cleaning agent fountain to bathe the printhead die as it traverses over the printhead cleaning device (100). As with the first cleaning agent fountain, the second cleaning agent fountain may be a meniscus fountain.

In this example, the first drying device (208) may be disposed between the spouts (102). However, other arrangements may be implemented as well. The second spout (102-2) may provide additional cleaning capability. In this example, during a first pass of the printhead die over the printhead cleaning device (100), such as when the printhead die is returning from depositing fluid, the pump (104) may be activated to generate the first cleaning agent fountain and the second cleaning agent fountain. During this first pass, the fountains bathe the printhead die in cleaning agent thus removing debris. Also, during this first pass, the bristles of the brush interface with the surface of the printhead die to remove debris and crusted-on fluid from the printhead die.

By comparison, during a second pass of the printhead die over the printhead cleaning device (100), such as when the printhead die is heading out to deposit fluid, the pump (104) may be de-activated to prevent generation of the fountains, thus preventing excess cleaning agent, from remaining on the printhead die as it deposits fluid on a target surface. During this second pass however, the printhead die still interfaces with the brush which wicks away any residual cleaning agent and to abrade off any solid particles from the printhead die.

Figure 7:
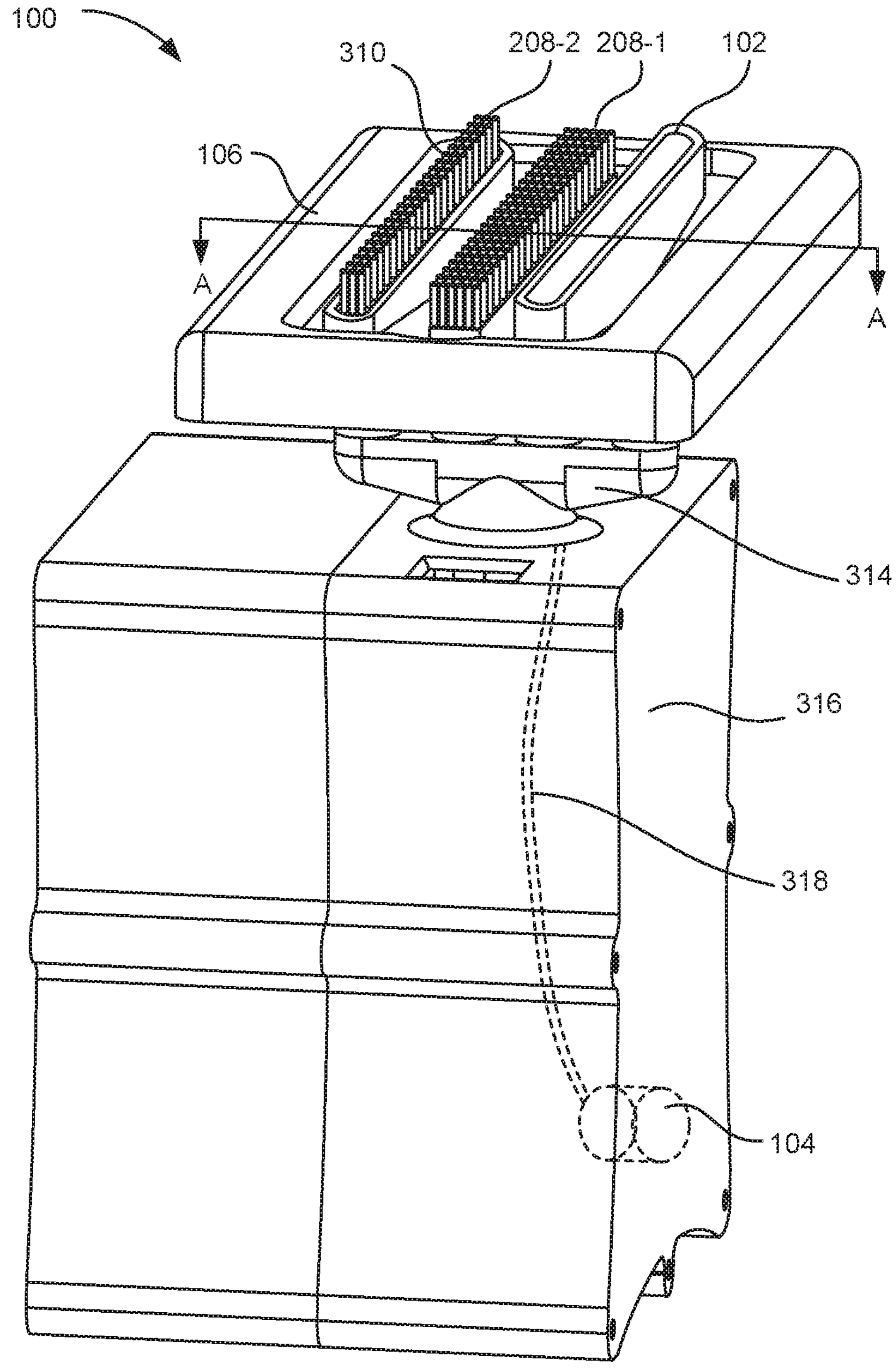
FIG. 7 is an isometric view of a printhead cleaning device with a cleaning agent fountain, according to an example of the principles described herein.

FIG. 7 is an isometric view of a printhead cleaning device (100) with a cleaning agent fountain, according to an example of the principles described herein. In the example depicted in FIG. 7, the printhead cleaning device (100) includes a second drying device (208-2) to remove residual cleaning agent and debris from the printhead die. In the example, depicted in FIG. 7, the first drying device (208-1) is a wicking brush and the second drying device (208-2) is a wet brush that generates a second cleaning agent fountain and also has a brush to wick away residual cleaning agent. While specific drying devices (208) are depicted in FIG. 7, other drying devices (208) such as those described above, may be implemented in accordance with the principles described herein.

In this example, during a first pass of the printhead die over the printhead cleaning device (100), such as when the printhead die is returning from depositing fluid, the pump (104) may be activated to generate the first cleaning agent fountain and the second cleaning agent fountain. During this first pass, the fountains bathe the printhead die in cleaning agent thus removing debris. Also, during this first pass, the bristles of the brush interface with the surface of the printhead die to remove debris and crusted-on fluid from the printhead die.

By comparison, during a second pass of the printhead die over the printhead cleaning device (100), such as when the printhead die is heading out to deposit fluid, the pump (104) may be de-activated to prevent generation of the fountains, thus preventing excess cleaning agent from remaining on the printhead die as it deposits fluid on a target surface. During this second pass however, the printhead die still interfaces with the brush of the first drying device (208-1) and of the wet brush so as to wick away any residual cleaning agent and to abrade off any solid particles from the printhead die.

Figure 8:
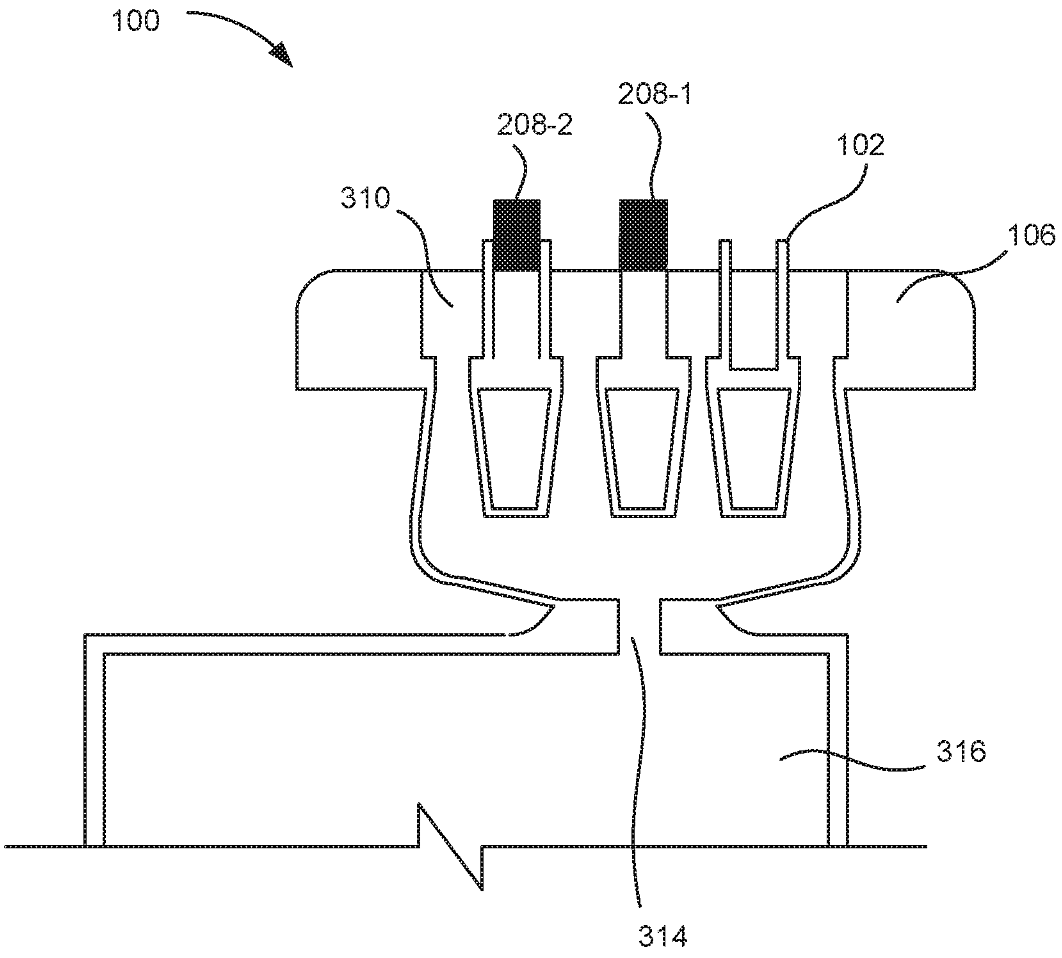
FIG. 8 is a cross-sectional view of a printhead cleaning device with a cleaning agent fountain, according to an example of the principles described herein.

FIG. 8 is a cross-sectional view of a printhead cleaning device (100) with a cleaning agent fountain, according to an example of the principles described herein. Specifically, FIG. 8 is a cross-sectional view taken along the line A-A from FIG. 7. From this view, the fluid conduit (314) that collects fluid from the collection receptacle (310) are clearly visible. As described above, after cleaning agent is expelled through the spouts (102), it is collected in the collection receptacle (310) where it flows back to the reservoir (316) through the fluid conduit (314). In some examples, the printhead cleaning device (100) includes a liquid trap along the fluid conduit (314) to prevent evaporated cleaning agent in the reservoir (316) from interfacing with the printhead die. That is, the fluid conduits (314) are sloped such that cleaning agent drains from the collection receptacle (310). Along the flow path through the fluid conduit (314), there is a liquid trap that fills up with recycled cleaning agent to prevent water vapor from traveling upwards towards the collection receptacle (310) where it may interact with an overpassing printhead die.

In summary, the fluid conduits (314) allow cleaning agent to flow and drain from the collection receptacle (310). The fluid flow travels down baffles and channels and fills a small chamber of the liquid trap that forms a column. Under heavy flow, this trap provides a delta pressure to push the bulk of the cleaning fluid into a small metered orifice at the bottom which is just before the main holding tank. When the cleaning agent flow becomes sparse and static, the pressure delta changes and a few droplets of cleaning agent remain to cover the orifice to block fluid vapor from rising out of the reservoir (316) and through the baffles and channels of the fluid conduits (314).

For example, it may be the case that the cleaning agent, which may be water, may be at a temperature of greater than 50 degrees Celsius. At this temperature the water may evaporate. If allowed to contact the printhead die, this water vapor may damage the printhead die, or co-mingle with and alter the chemical makeup of the fluid being ejected. Moreover, if left on the surface during printing, this water vapor may drop from the printhead die while it is over the target substrate, which may be undesirable. Accordingly, the liquid trap prevents water vapor from contacting the printhead die and potentially interfering with the printing process or other operation of the printhead die.

Figure 9:
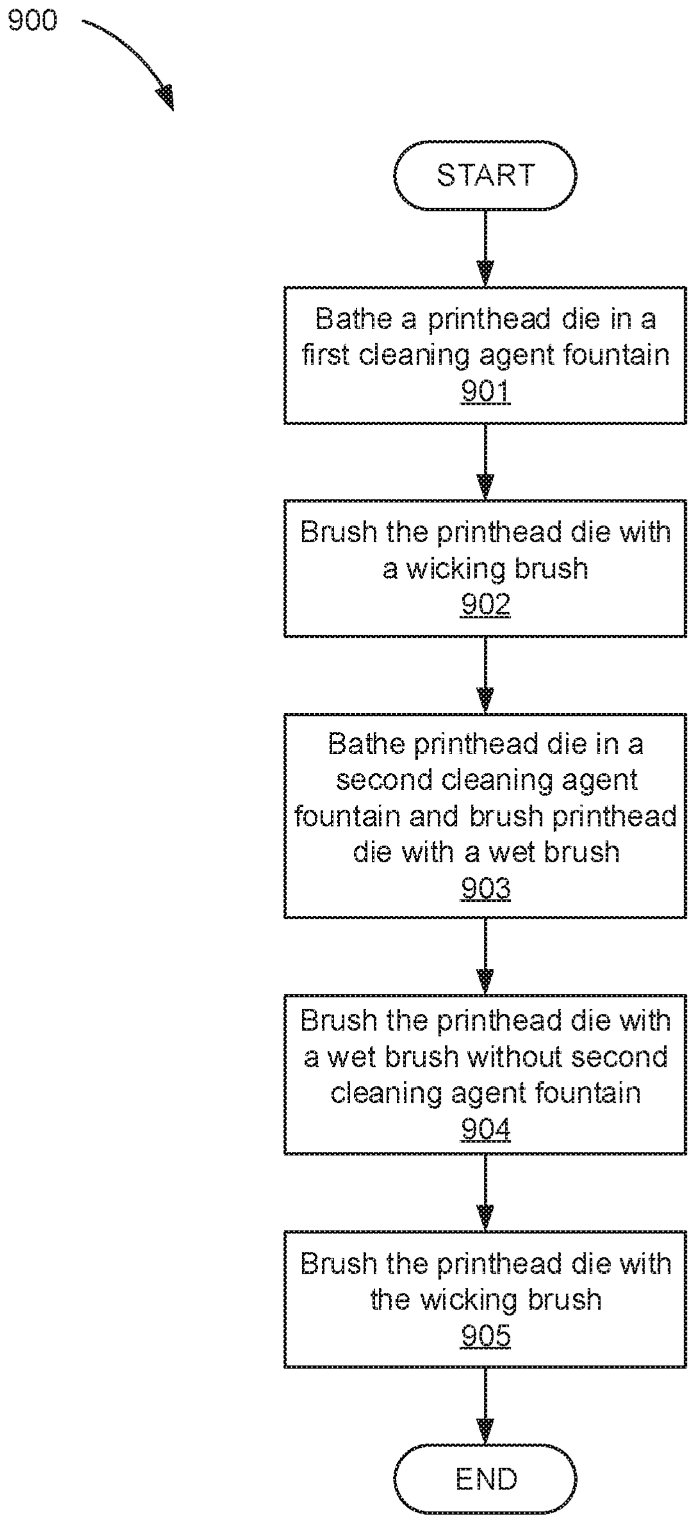
FIG. 9 is a flowchart of a method for cleaning a printhead die with a cleaning agent fountain, according to an example of the principles described herein.

FIG. 9 is a flowchart of a method (100) for cleaning a printhead die with a cleaning agent fountain, according to an example of the principles described herein. That is, FIG. 9 depicts the operation of the printhead cleaning device (FIG. 1, 100) described herein. The printhead cleaning device (FIG. 1, 100) may operate differently depending on how the printhead die is traversing. For example, a first pass may refer to the passing of a printhead die over the printhead cleaning device (FIG. 1, 100) after the printhead die has just deposited fluid in the printing area. That is, the printhead die may travel along a path away from the printing area of the printing device (FIG. 4, 420). The printhead die may continue along this path out of the printing area to be over the printhead cleaning device (FIG. 1, 100).

By comparison, during a second pass, the printhead die may be headed out towards the print area to deposit a print fluid. For example, after returning from one run across the printing area, the printhead die may depart towards the area and in so doing may cross again over the printhead cleaning device (FIG. 1, 100). Examples of the different passes are depicted below in connection with FIGS. 11A-11H.

During the first pass of the printhead die over the printhead cleaning device (FIG. 1, 100), which first pass is in a first direction, the printhead die is bathed (block 901) in a first cleaning agent fountain, which again may be a meniscus fountain. As described, this fountain dissolves, breaks up, or otherwise cleans fluid and/or powder build material off of the printhead die. Still during this first pass, the printhead die is brushed (block 902) with a wicking brush or other drying device. As described above, this brush may have structural characteristics such that it does not abrade off the debris, but rather wicks away any moisture by breaking the surface tension of the cleaning agent and the surface of the printhead die.

Still along this first pass, the printhead die is simultaneously bathed (block 903) in a second cleaning agent fountain, which may be a meniscus fountain as well, and brushed with the wet brush. Again, this happens as the printhead die traverses over the printhead cleaning device (FIG. 1, 100) for example after depositing fluid.

During a second pass of the printhead die over the printhead cleaning device (FIG. 1, 100), which second pass is in a second direction, the printhead die is brushed (block 904) with the bristles of the wet brush. However, during this second pass, the pump (FIG. 1, 104) is de-activated such that the wet brush is not generating a fountain. Still during this second pass, the printhead die is brushed (block 905) with the wicking brush. Accordingly, accumulated ejected fluid and debris is removed from the printhead die.

Figure 10:
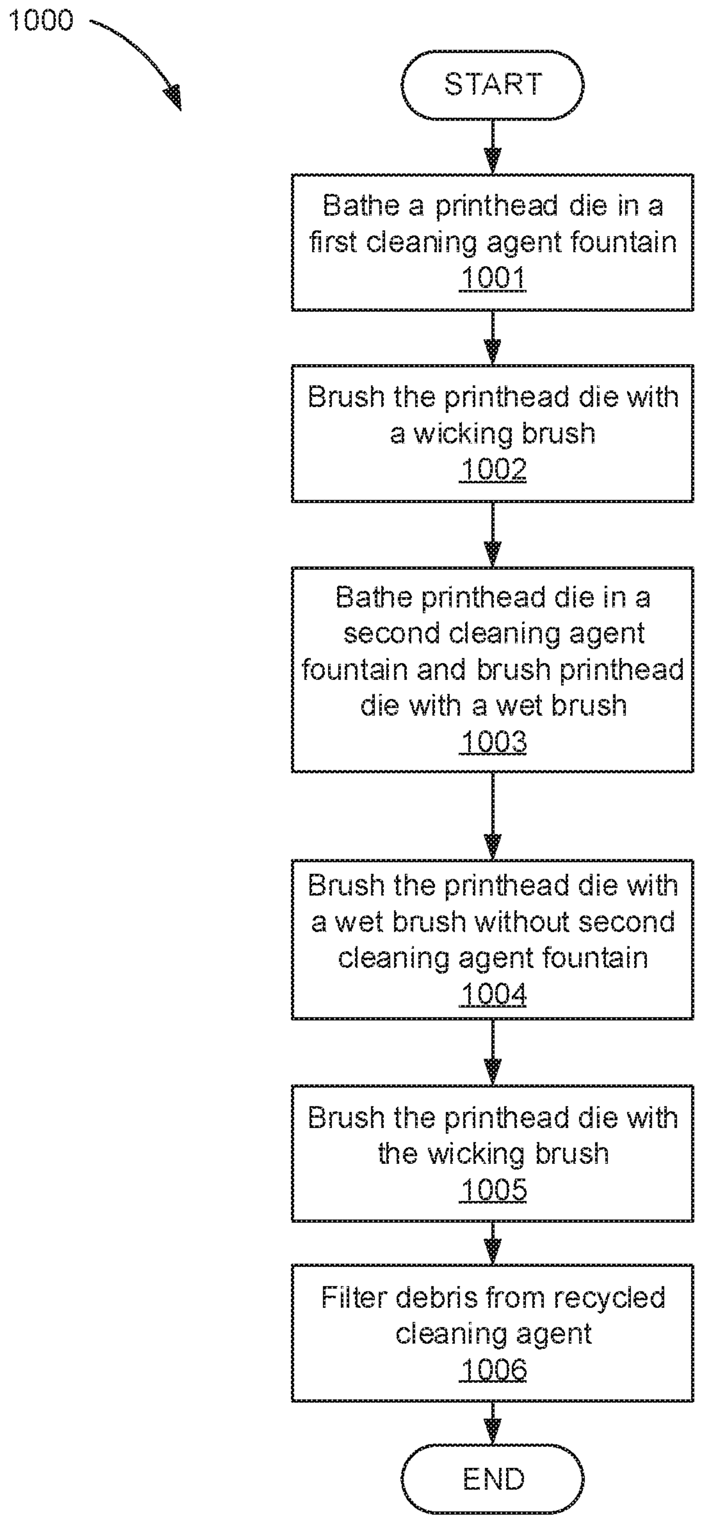
FIG. 10 is a flowchart of a method for cleaning a printhead die with a cleaning agent fountain, according to an example of the principles described herein.

FIG. 10 is a flowchart of a method (1000) for cleaning a printhead die with a cleaning agent fountain, according to an example of the principles described herein. According to this example, during the first pass of the printhead die over the printhead cleaning device (FIG. 1, 100), the printhead die is 1) bathed (block 1001) in a first cleaning agent fountain, 2) brushed (block 1002) with a wicking brush or other drying device; and 3) is simultaneously bathed (block 1003) in a second cleaning agent fountain and brushed with the wet brush. These operations may be performed as described above in connection with FIG. 9.

During a second pass of the printhead die over the printhead cleaning device (FIG. 1, 100), which second pass is in a second direction, the printhead die is brushed (block 1004) with the bristles of the wet brush while the pump (FIG. 1, 104) is de-activated and brushed (block 1005) with the bristles of the wicking brush. These operations as well may be performed as described above in connection with FIG. 9.

As described above, the excess cleaning agent is collected in a collection receptacle (FIG. 3, 310) which may be recycled to the reservoir (FIG. 3, 316). Along the return path, the printhead cleaning device (FIG. 1, 100) may filter (block 1006) debris from recycled cleaning agent. That is, any collected debris may clog the printhead cleaning device (FIG. 1, 100) and may impede the cleaning efficacy of the printhead cleaning device (FIG. 1, 100). Accordingly, by filtering the recycled cleaning agent, the printhead cleaning device (FIG. 1, 100) prolongs the life of the cleaning agent.

FIGS. 11A-11H are views of stages of cleaning a printhead die with a cleaning agent fountain (1130), according to an example of the principles described herein. As described above, the print cartridge (1124) includes a printhead die (1126) that ejects drops of fluid through a plurality of fluid ejectors towards a medium. The medium may be any type of suitable sheet or roll material, such as paper, card stock, transparencies, polyester, plywood, foam board, fabric, canvas, and the like. In another example, the medium may be a bed of powder material used in three-dimensional printing. In other examples, the medium may be a well plate with various reservoir wells, an assay membrane, or a sensor substrate.

Figure 11A:
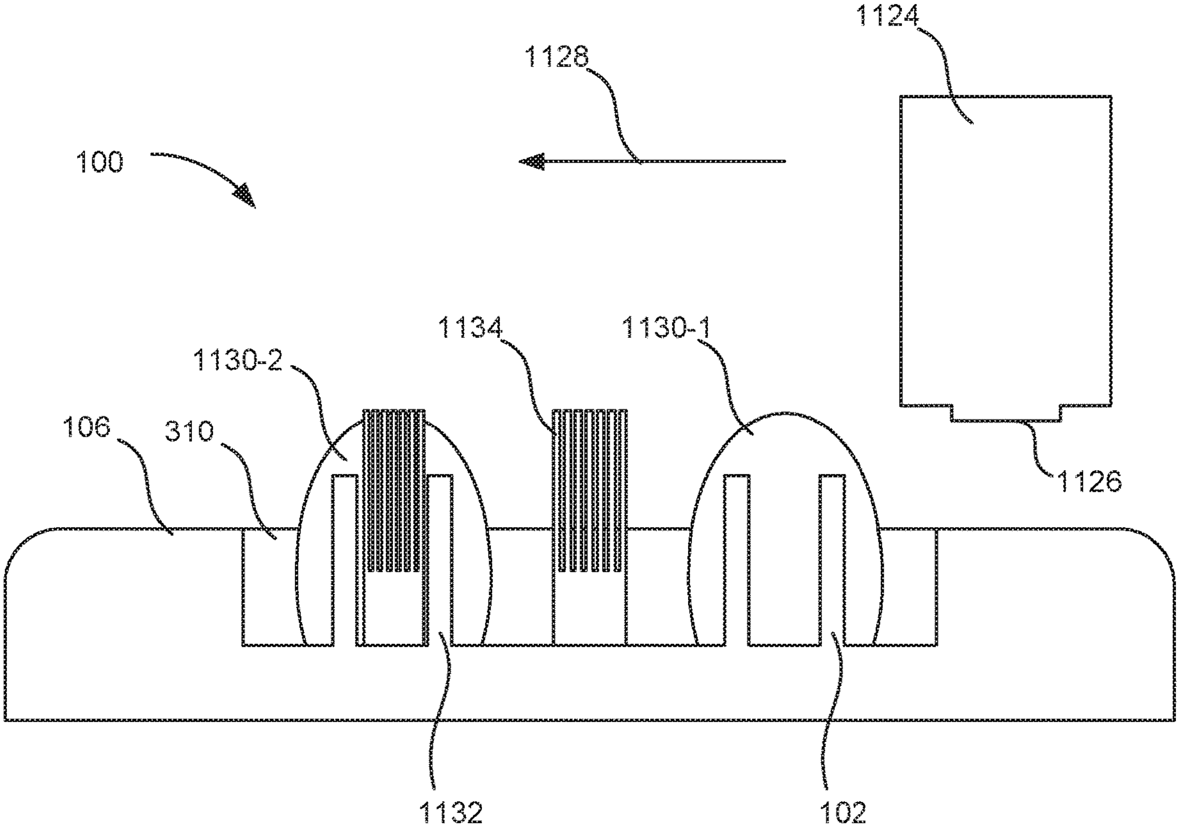
FIGS. 11A-11H are views of stages of cleaning a printhead die with a cleaning agent fountain, according to an example of the principles described herein.

To eject fluid, the printing device (FIG. 4, 420) moves the carriage containing the print cartridge (1124) relative to a medium. At appropriate times, the printing system (FIG. 4, 420) sends electrical signals to the print cartridge (1124). The printhead die (1126) then ejects a small droplet of fluid onto the surface of the medium. Once the print cartridge (1124) has reached the edge of the printing area, it continues along its path as indicated by the arrow (1124) towards the printhead cleaning device (100). As the print cartridge (1124) approaches the printhead cleaning device (100), a controller activates the pump (FIG. 1, 104) to generate both the first cleaning agent fountain (1130-1) at a first spout (102) and a second cleaning agent fountain (1130-2) at a wet brush (1132) as depicted in FIG. 11A. Note that in this example, the first drying device is a brush (1134). Note also that in the examples depicted in FIG. 11A-11H, the fountains (1130) are meniscus fountains that are cohesive as they fall.

Figure 11B:
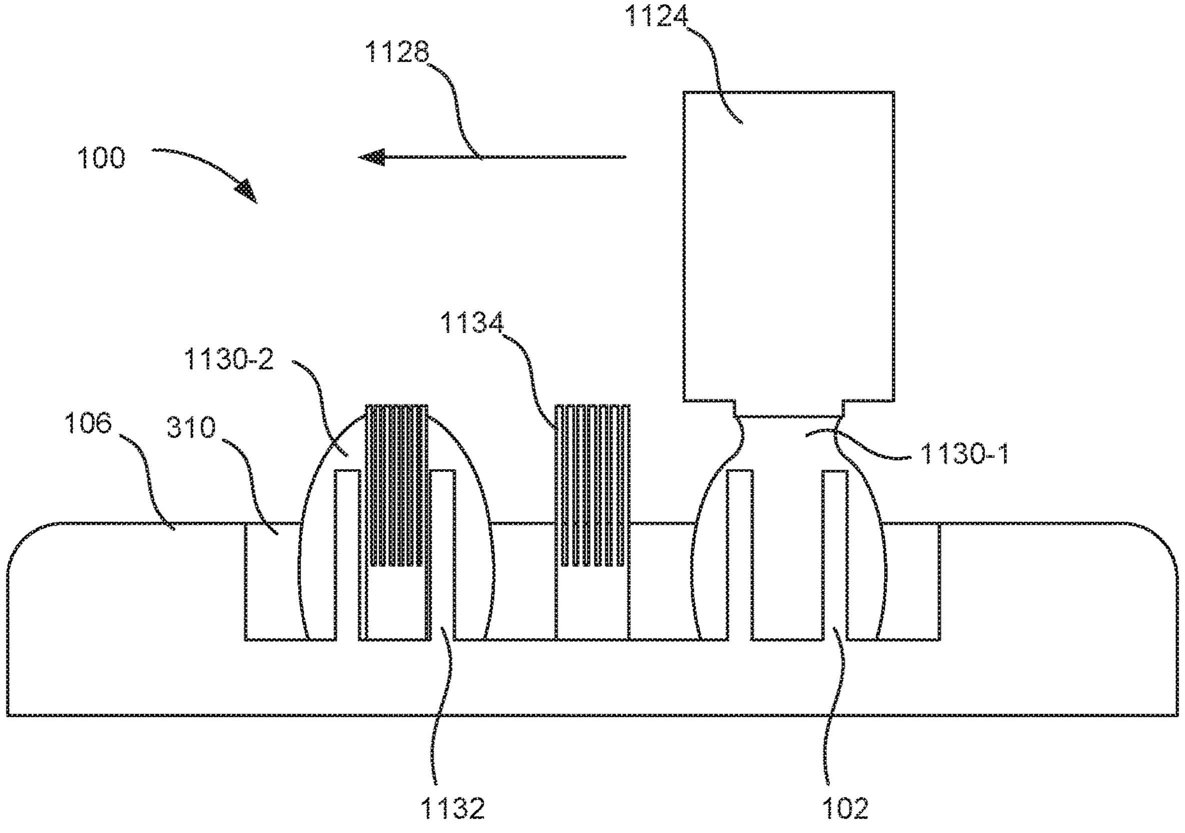

As the print cartridge (1124) passes over the first cleaning agent fountain (1130-1) as depicted in FIG. 11B, the first cleaning agent fountain (1130-1) bathes the printhead die (FIG. 11A, 1124) in the cleaning agent, thus operating to remove residual and/or crusted ejected fluid as well as any debris that may have accumulated on the printhead die (FIG. 11A, 1124).

The bathing of the printhead die (FIG. 11A, 1124) in the first fountain (1130-1) also serves to cool the printhead die (FIG. 11A, 1124). That is, during fluid ejection, the action of the fluid ejectors may build up heat in the printhead die (FIG. 11A, 1124), which may affect the chemical makeup of the fluid being deposited and may affect the life and operational characteristics of the printhead die (FIG. 11A, 1124). Accordingly, by passing through the first fountain (1130-1), the printhead die (FIG. 11A, 1124) is cooled and increases the performance and life of the printhead die (FIG. 11A, 1124). Moreover, in some examples because the printhead die (FIG. 11A, 1124) is cooled, the printhead die (FIG. 11A, 1124) may be operated ata higher temperature, which may result in increased performance and/or quicker print rates.

In some examples, when the printhead die (FIG. 11A, 1126) is bathed in the first fountain (1130-1), the fluid ejectors may be actuated. Doing so expels fluid from the printhead die (FIG. 11A, 1126) which may otherwise block or otherwise impact the performance of the printhead die (FIG. 11A, 1126). That is, expelling fluid from the printhead die (FIG. 11A, 1126) operates to clean out, or purge, the fluid ejectors.

Accordingly, a controller of the printing device (FIG. 4, 420) may activate the fluid ejectors when they are bathed in the first fountain (1130-1). For example, the printing system (FIG. 4, 420), may include a component that tracks the location of the print cartridge (1124) either based on position data, timing data, or a sensor that indicates the position of the print cartridge (1124). From this data, the printing system (FIG. 4, 420) may determine when the print cartridge (1124) is disposed over the printhead cleaning device (100) and may activate the fluid ejectors when they are disposed over the printhead cleaning device (100).

In a specific example, the activation of the fluid ejectors in the fountain bath may be based on an output of a sensor, such as a moisture sensor which may be disposed on the printhead die (FIG. 11A, 1126). Accordingly, the first fountain (1130-1) allows for the jetting of fluid directly into a fluid seal created by the cleaning agent and the presoaked printhead die (FIG. 11A, 1126) surface. Ejecting fluid into the first fountain (1130-1) eliminates overspray contamination into the local environment and prevents fluid drops from returning back onto the printhead die (FIG. 11A, 1126). That is, were the fluid ejectors activated outside of the fountain bath, there is a chance that fluid may impact a surface and rebound to contact the printhead die (FIG. 11A, 1126).

Firing the fluid ejectors into the first fountain (1130-1) also reduces contamination due to aerosol produced by ink jetting and forming a cloud that re-deposits ink on the printhead die (FIG. 11A, 1126). Accordingly, by jetting fluid into the first fountain (1130-1), the nozzle may be cleaned out or purged, all while preventing ejected fluid from re-depositing, either as droplets or aerosol, onto the printhead die (FIG. 11A, 1126).

Figure 11C:
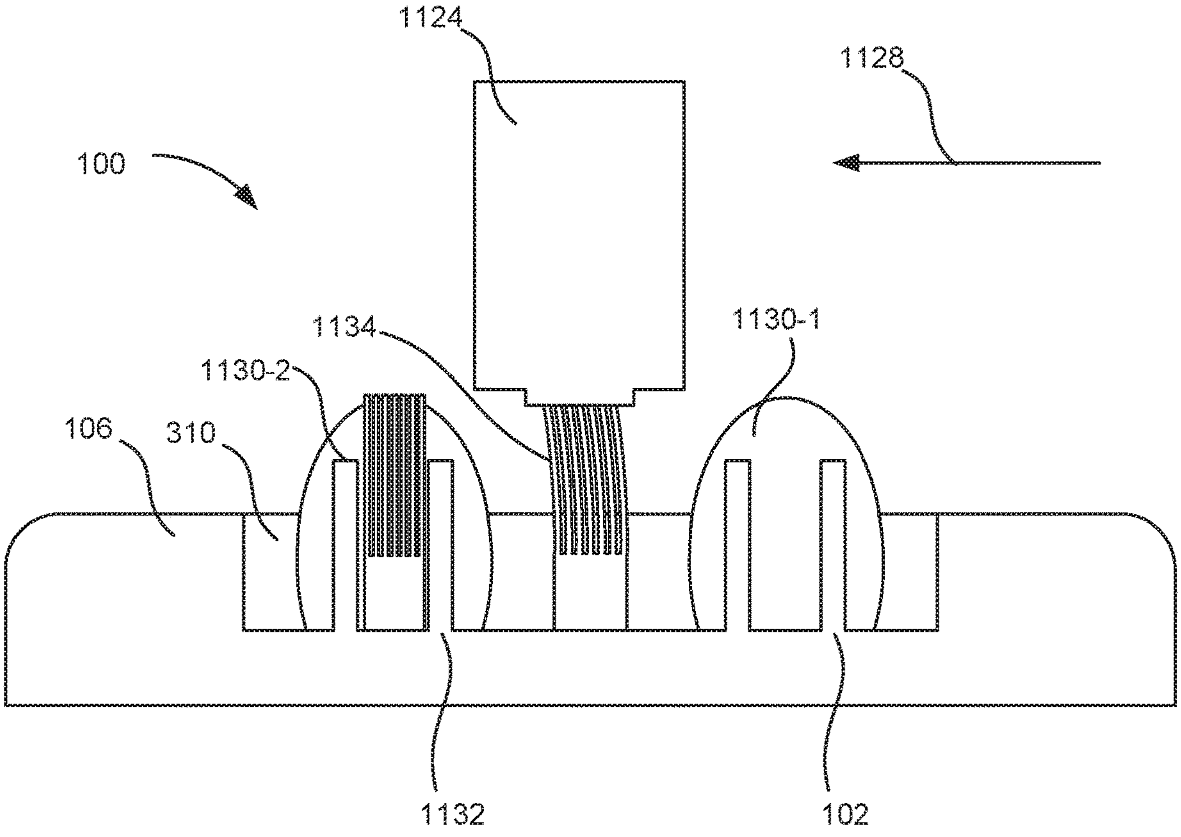

The print cartridge (1124) continues along the first pass away from the medium as depicted in FIG. 11C where it interacts with the wicking brush (1134) which as described above gently wicks away residual cleaning agent. The residual, or extra, cleaning agent is collected in the collection receptacle (310) from where it may be recycled to the reservoir (FIG. 3, 316).

Figure 11D:
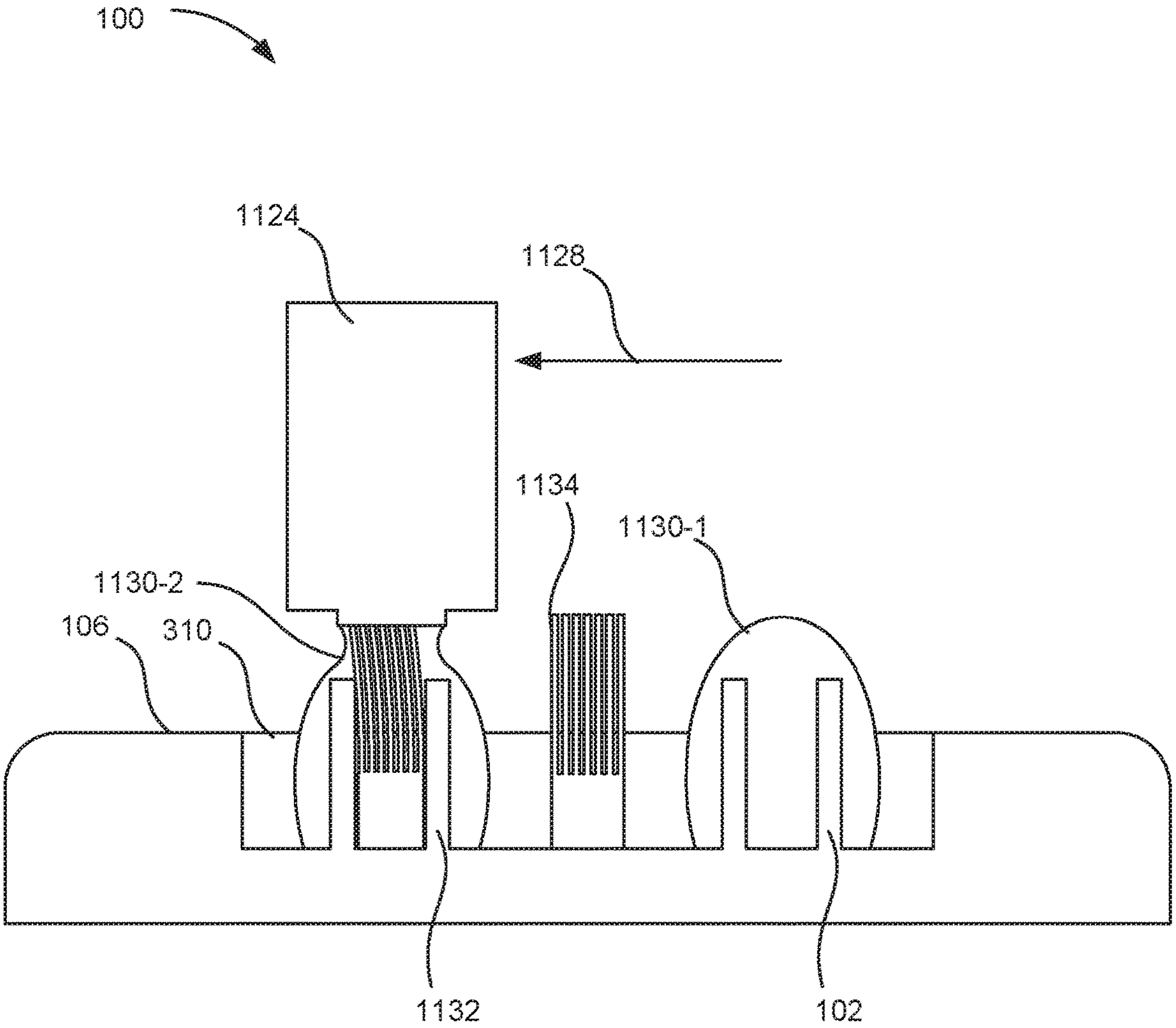

As depicted in FIG. 11D, the print cartridge (1124) continues along the first pass to interact with the wet brush (1132) where the printhead die (FIG. 11A, 1126) is bathed in a second fountain (1130-2) while bristles of the wet brush (1132) agitate debris off the printhead die (FIG. 11A, 1126) and wick away residual cleaning agent from the surface.

Figure 11E:
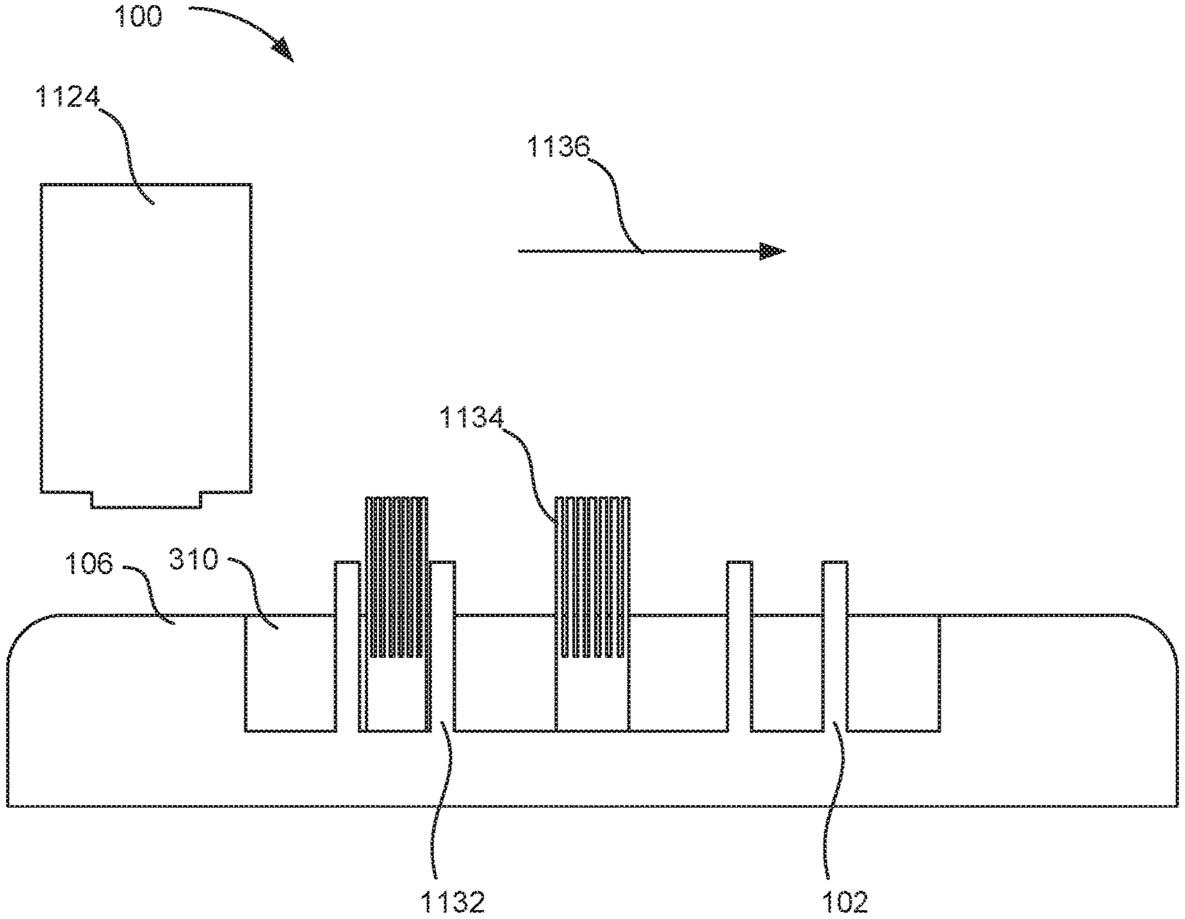

As depicted in FIG. 11E, the print cartridge (1124) continues past this wet brush (1132) to end the first pass. At this point, the pump (FIG. 1, 104) is de-activated such that the fountains (FIG. 11A, 1130) are not present. The print cartridge (1124) then begins a second pass in a second direction as indicated by the arrow (1136). This second pass is in the opposite direction compared to the first pass. For example, during the second pass, the print cartridge (1124) may travel towards the medium to deposit a fluid on a target surface.

Figure 11F:
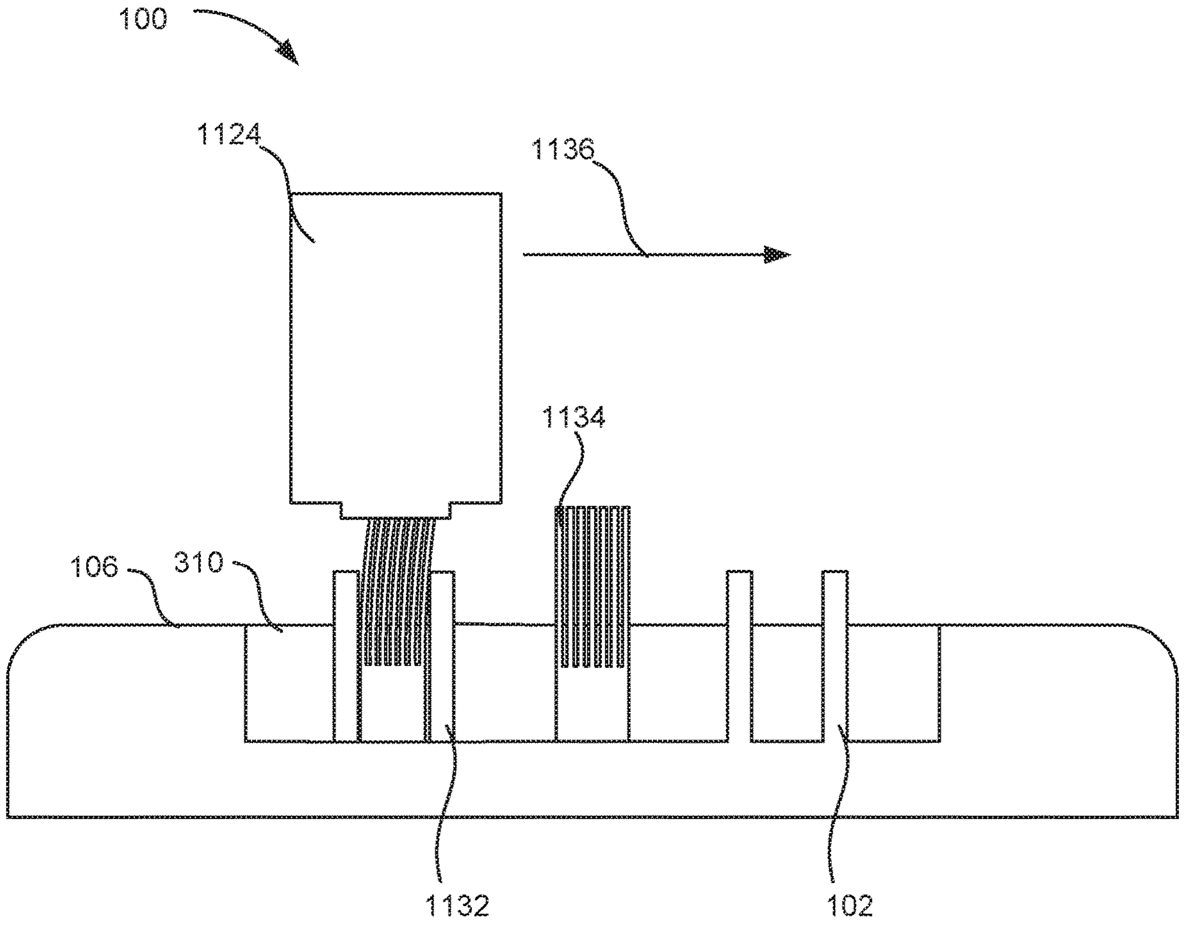

As depicted in FIG. 11F, the printhead die (FIG. 11A, 1126) again interfaces with the bristles of the wet brush (1132). However, during the second pass, the second fountain (FIG. 11A, 1130-2) is not present. In this example, the bristles of the wet brush (1132) may continue to agitate off any remaining debris or other residual material and wick away any remaining cleaning agent from off the surface of the printhead die (FIG. 11A, 1126).

Figure 11G:
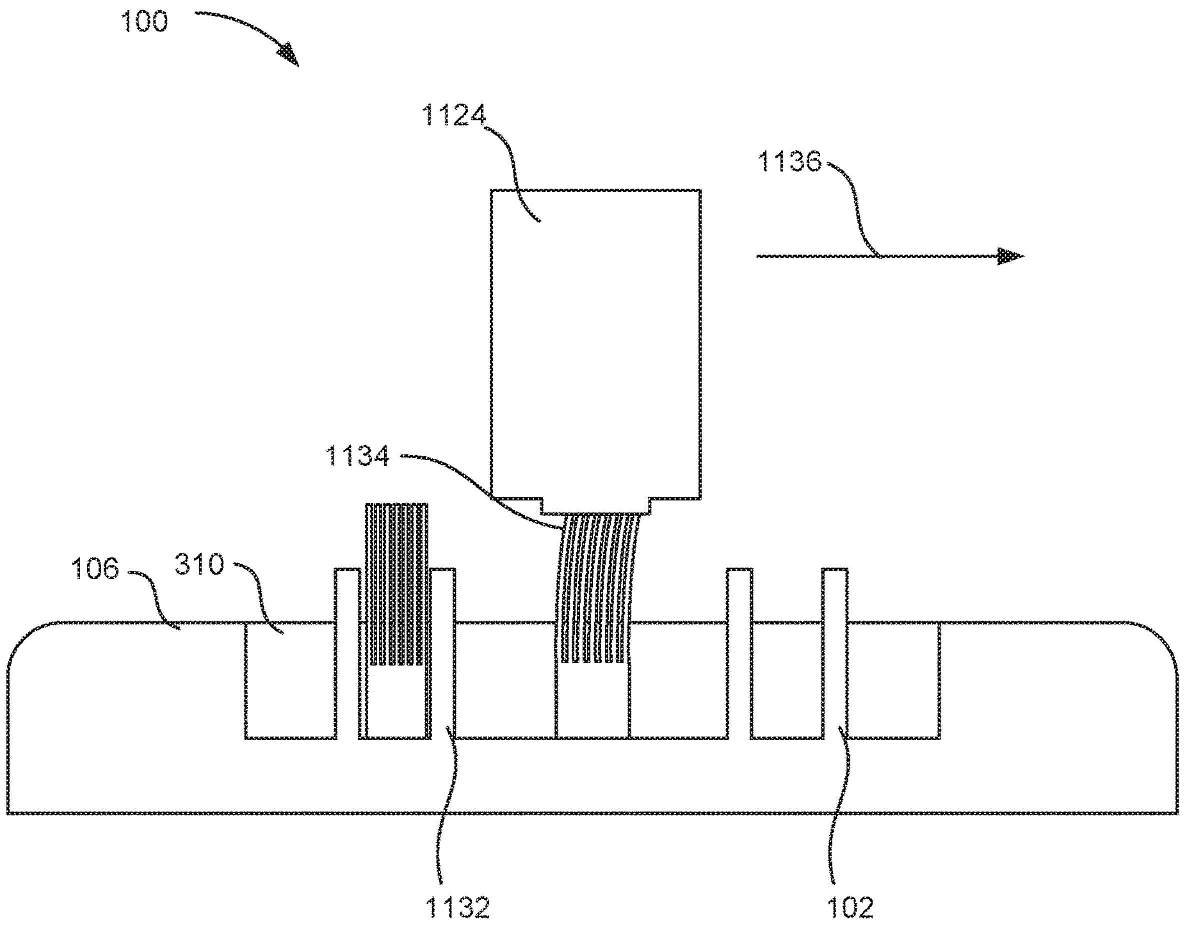

Continuing along this path as depicted in FIG. 11G, the printhead die (1120) again interfaces with the bristles of the wicking brush (1134). The bristles of the wicking brush (1134) may continue to agitate off any remaining debris or other residual material and wick away any remaining cleaning agent from off the surface of the printhead die (FIG. 11A, 1126).

Figure 11H:
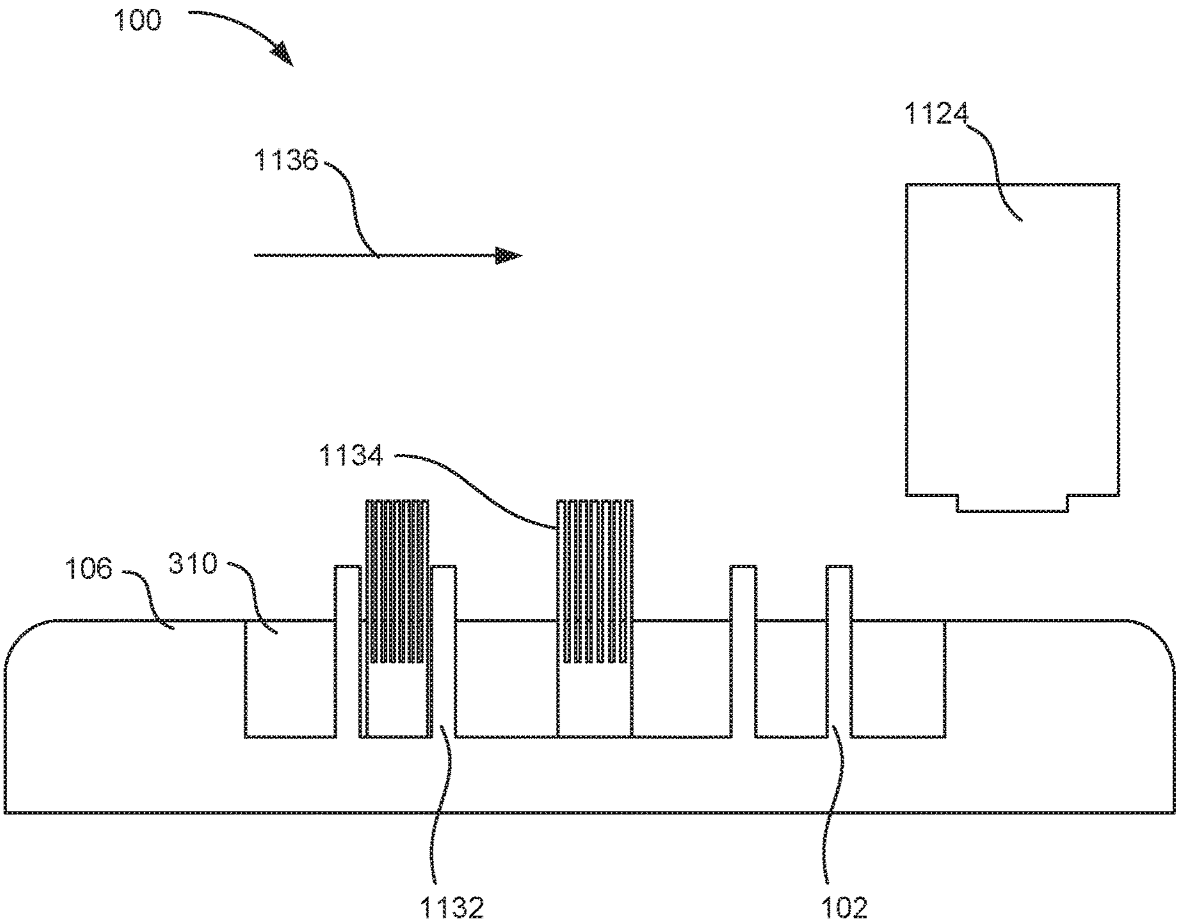

As depicted in FIG. 11H, the print cartridge (1124) then continues past the printhead cleaning device (100) for example to execute another deposition run of fluid on a target surface.

Note that the operation of the printhead cleaning device (100) may be performed on a variety of intervals. For example, a processor may direct the print cartridge (1124) to traverse over the printhead cleaning device (100) based on a certain timing. The timing may be after every deposition run of the print cartridge (1124), after a predetermined number of deposition runs, or after a job. For example, a controller of the print device (FIG. 4, 420) may trigger the print cartridge (1124) to travel along its path past the printhead cleaning device (100) following five deposition runs or trips across the print area.

Such a printhead cleaning device (100) provides a more effective cleaning cycle due to cleaning and drying the printhead die (FIG. 11A, 1126) in both directions in the linear axis (coming and going from the cartridges perspective) (presoak/ink jetting, 1st pass wipe/wicking, wet agitation, and last process, wicking to dry).

Figure 12:
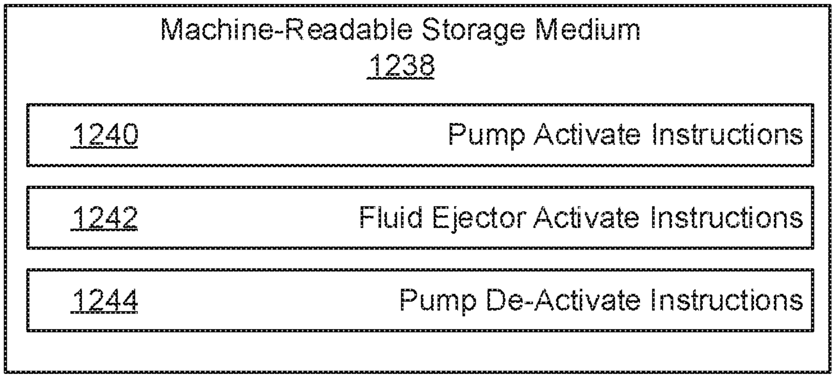
FIG. 12 depicts a non-transitory machine-readable storage medium for cleaning a printhead die with a cleaning agent fountain, according to an example of the principles described herein.

FIG. 12 depicts a non-transitory machine-readable storage medium (1238) for cleaning a printhead die (FIG. 11A, 1126) with a cleaning agent fountain, according to an example of the principles described herein. To achieve its desired functionality, a printing device (FIG. 4, 420) includes various hardware components. Specifically, a printing device (FIG. 4, 420) includes a processor and a machine-readable storage medium (1238). The machine-readable storage medium (1238) is communicatively coupled to the processor. The machine-readable storage medium (1238) includes a number of instructions (1240, 1242, 1244) for performing a designated function. The machine-readable storage medium (1238) causes the processor to execute the designated function of the instructions (1240, 1242, 1244). The machine-readable storage medium (1238) can store data, programs, instructions, or any other machine-readable data that can be utilized to operate the printing device (FIG. 4, 420). Machine-readable storage medium (1238) can store computer readable instructions that the processor of the printing device (FIG. 4, 420) can process, or execute. The machine-readable storage medium (1238) can be an electronic, magnetic, optical, or other physical storage device that contains or stores executable instructions. Machine-readable storage medium (1238) may be, for example, Random Access Memory (RAM), an Electrically Erasable Programmable Read-Only Memory (EEPROM), a storage device, an optical disc, etc. The machine-readable storage medium (1238) may be a non-transitory machine-readable storage medium (1238). The processor may include the hardware architecture to retrieve executable code from the memory and execute the executable code.

Referring to FIG. 12, pump activate instructions (1240), during a first pass of the printhead die (FIG. 11A, 1126) over a printhead cleaning device (FIG. 1, 100) activates a pump (FIG. 1, 104) to generate a first cleaning agent fountain (FIG. 11A, 1130-1) and a second cleaning agent fountain (FIG. 11A, 1130-2) as the print cartridge (FIG. 11A, 1124) traverses over the printhead cleaning device (FIG. 1, 100).

Fluid ejector instructions (1240), during the first pass of the printhead die (FIG. 11A, 1126) over a printhead cleaning device (FIG. 1, 100) activates fluid ejectors of the printhead die (FIG. 11A, 1126) when the printhead die (FIG. 11A, 1126) is bathed in the first cleaning agent fountain (FIG. 11A, 1130-1). Pump de-activate instructions (1244), during a second pass of the printhead die (FIG. 11A, 1126) over the printhead cleaning device (FIG. 1, 100), de-activates the pump (FIG. 1, 104) to facilitate dry agitation of the printhead die (FIG. 11A, 1126) by brushes of the printhead cleaning device (FIG. 1, 100).

As described above, the above printhead cleaning devices remove many types of stubborn, harsh ink-jetted fluids from the printhead die without degrading the printhead die. Moreover, such a printhead cleaning device 1) reduces cycle time by cleaning and drying the printhead die in both directions in a printing cycle; 2) is in-line with the print cartridge travel path; 3) is low maintenance with a single moving part, i.e., a pump; 4) avoids use of paper medium for fluid capture or drying; 5) cools the printhead die; 6) provides local or remote cleaning agent collection; and 7) prevents contact between a cleaning agent and other portions of the print cartridge.

What is claimed is:

1. A printhead cleaning device, comprising:

a first spout to generate a first cleaning agent fountain to bathe a printhead die as it traverses over the printhead cleaning device, wherein the first cleaning agent fountain is a meniscus fountain that maintains fluid cohesion as it is generated at the first spout;

a pump to pass cleaning agent through the first spout to generate the first cleaning agent fountain; and a structure to support the first spout.

2. The printhead cleaning device of claim 1, further comprising a first drying device to remove residual cleaning agent and debris from the printhead die.

3. The printhead cleaning device of claim 2, wherein the first drying device is selected from a group consisting of:

a wicking brush;

a squeegee;

an air knife;

a wiping surface; and a wet brush comprising:

a second spout to bathe the printhead die in a second cleaning agent fountain; and bristles to interface with a surface of the printhead die.

4. The printhead cleaning device of claim 2, wherein the first drying device is disposed over the first spout and enveloped by the first cleaning agent fountain.

5. The printhead cleaning device of claim 2, further comprising a second spout to generate a second cleaning agent fountain to bathe the printhead die as it traverses over the printhead cleaning device.

6. The printhead cleaning device of claim 2, further comprising a second drying device to remove the residual cleaning agent and debris from the printhead die.

7. The printhead cleaning device of claim 1, wherein the printhead cleaning device is disposed:

in a printing device; and adjacent a print area of the printing device.

8. The printhead cleaning device of claim 1, further comprising:

a collection receptacle to gather excess cleaning agent, wherein the first spout and a first drying device are disposed in the collection receptacle;

a reservoir coupled to the collection receptacle; and a fluid conduit coupling the collection receptacle to the reservoir.

9. The printhead cleaning device of claim 8, further comprising a liquid trap along the fluid conduit to prevent evaporated cleaning agent in the reservoir from interfacing with the printhead die.

10. The printhead cleaning device of claim 8, wherein the reservoir, the fluid conduit, the first spout, and the first drying device are integrated into a single housing of the printhead cleaning device.

11. A method, comprising:

during a first pass of a printhead die over a printhead cleaning device, wherein the first pass is in a first direction:

bathing the printhead die in a first cleaning agent meniscus fountain;

brushing the printhead die with a wicking brush; and simultaneously:

bathing the printhead die in a second cleaning agent meniscus fountain; and brushing the printhead die with a wet brush; and during a second pass of the printhead die over the printhead cleaning device, wherein the second pass is in a second direction:

brushing the printhead die with the wet brush without the second cleaning agent meniscus fountain; and brushing the printhead die with the wicking brush.

12. The method of claim 11, further comprising filtering debris from a recycled cleaning agent.

13. A non-transitory machine-readable storage medium encoded with instructions executable by a processor, the non-transitory machine-readable storage medium comprising instructions to:

during a first pass of a printhead die over a printhead cleaning device, wherein the first pass is in a first direction:

activate a pump to generate a first cleaning agent meniscus fountain and a second cleaning agent meniscus fountain as the printhead die traverses over the printhead cleaning device; and activate fluid ejectors of the printhead die when the printhead die is bathed in the first cleaning agent meniscus fountain; and during a second pass of the printhead die over the printhead cleaning device, wherein the second pass is in a second direction, de-activate the pump to facilitate dry agitation of the printhead die by brushes of the printhead cleaning device.

14. The non-transitory machine-readable storage medium of claim 13, further comprising instructions, executable by the processor to direct the printhead die to traverse over the printhead cleaning device based on timing selected from a group consisting of:

after every deposition run of a fluid;

after a predetermined number of deposition runs; and after a job.

* * * * *